(12) United States Patent
Declerck et al.

(10) Patent No.: US 12,339,511 B2
(45) Date of Patent: Jun. 24, 2025

(54) FIBER OPTIC CABLE MANAGEMENT SYSTEMS AND METHODS

(71) Applicant: COMMSCOPE TECHNOLOGIES LLC, Hickory, NC (US)

(72) Inventors: Thierry Mike Declerck, Tienen (BE); Debora Dockx, Duffel (BE)

(73) Assignee: CommScope Technologies LLC, Claremont, NC (US)

( * ) Notice: Subject to any disclaimer, the term of this patent is extended or adjusted under 35 U.S.C. 154(b) by 130 days.

(21) Appl. No.: 17/916,419

(22) PCT Filed: Mar. 31, 2021

(86) PCT No.: PCT/US2021/025135
§ 371 (c)(1),
(2) Date: Sep. 30, 2022

(87) PCT Pub. No.: WO2021/202700
PCT Pub. Date: Oct. 7, 2021

(65) Prior Publication Data
US 2023/0140141 A1    May 4, 2023

Related U.S. Application Data

(60) Provisional application No. 63/003,043, filed on Mar. 31, 2020.

(51) Int. Cl.
*G02B 6/00* (2006.01)
*G02B 6/44* (2006.01)

(52) U.S. Cl.
CPC ......... *G02B 6/4452* (2013.01); *G02B 6/4447* (2013.01)

(58) Field of Classification Search
CPC ............... G02B 6/4452; G02B 6/4447; G02B 6/44524; G02B 6/44515; G02B 6/44528; G02B 6/3608; G02B 6/00
See application file for complete search history.

(56) References Cited

U.S. PATENT DOCUMENTS

| 3,330,105 A | 7/1967 | Weber |
| 4,359,262 A | 11/1982 | Dolan |
| 4,502,754 A | 3/1985 | Kawa |

(Continued)

FOREIGN PATENT DOCUMENTS

| AU | 40995/85 | 4/1985 |
| AU | 55314/86 | 3/1986 |

(Continued)

OTHER PUBLICATIONS

Extended European Search Report for Application No. 21781458.1 mailed Mar. 12, 2024.

(Continued)

*Primary Examiner* — Jennifer Doan
(74) *Attorney, Agent, or Firm* — Merchant & Gould P.C.

(57) ABSTRACT

A fiber management cable assembly for facilitating routing and storing optical fibers includes a plurality of fiber fixation tabs. The plurality of fiber fixation tabs can provide fixation for optical fibers supported by, mounted on, or attached to components within a telecommunications enclosure. The plurality of fiber fixation tabs can secure optical fibers that are in a multi-fiber (e.g., ribbon) configuration or a single fiber configuration.

28 Claims, 11 Drawing Sheets

(56) References Cited

U.S. PATENT DOCUMENTS

| | | |
|---|---|---|
| 4,585,303 A | 4/1986 | Pinsard et al. |
| 4,595,255 A | 6/1986 | Bhatt et al. |
| 4,630,886 A | 12/1986 | Lauriello et al. |
| 4,697,874 A | 10/1987 | Nozick |
| 4,699,455 A | 10/1987 | Erbe et al. |
| 4,708,430 A | 11/1987 | Donaldson et al. |
| 4,717,231 A | 1/1988 | Dewez et al. |
| 4,725,120 A | 2/1988 | Parzygnat |
| 4,733,936 A | 3/1988 | Mikolaicyk et al. |
| 4,736,100 A | 4/1988 | Vastagh |
| 4,747,020 A | 5/1988 | Brickley et al. |
| 4,765,710 A | 8/1988 | Burmeister et al. |
| 4,792,203 A | 12/1988 | Nelson et al. |
| 4,824,196 A | 4/1989 | Bylander |
| 4,840,449 A | 6/1989 | Ghandeharizadeh |
| 4,861,134 A | 8/1989 | Alameel et al. |
| 4,900,123 A | 2/1990 | Barlow et al. |
| 4,948,220 A | 8/1990 | Violo et al. |
| 4,971,421 A | 11/1990 | Ori |
| 4,986,762 A | 1/1991 | Keith |
| 4,989,946 A | 2/1991 | Williams et al. |
| 4,995,688 A | 2/1991 | Anton et al. |
| 5,011,257 A | 4/1991 | Wettengel et al. |
| 5,023,646 A | 6/1991 | Ishida et al. |
| 5,058,983 A | 10/1991 | Corke et al. |
| 5,067,784 A | 11/1991 | Debortoli et al. |
| 5,071,211 A | 12/1991 | Debortoli et al. |
| 5,073,042 A | 12/1991 | Mulholland et al. |
| 5,076,688 A | 12/1991 | Bowen et al. |
| 5,100,221 A | 3/1992 | Carney et al. |
| 5,107,627 A | 4/1992 | Mock, Jr. et al. |
| 5,109,447 A | 4/1992 | Chan |
| 5,127,082 A | 6/1992 | Below et al. |
| 5,129,021 A | 7/1992 | Mortimore et al. |
| 5,129,030 A | 7/1992 | Petrunia |
| 5,138,688 A | 8/1992 | Debortoli |
| 5,142,598 A | 8/1992 | Tabone |
| 5,142,606 A | 8/1992 | Carney et al. |
| 5,155,785 A | 10/1992 | Holland et al. |
| 5,160,188 A | 11/1992 | Rorke et al. |
| 5,167,001 A | 11/1992 | Debortoli et al. |
| 5,179,618 A | 1/1993 | Anton |
| 5,204,925 A | 4/1993 | Bonanni et al. |
| 5,208,885 A | 5/1993 | Dragone et al. |
| 5,212,761 A | 5/1993 | Petrunia |
| 5,214,735 A | 5/1993 | Henneberger et al. |
| 5,233,674 A | 8/1993 | Vladic |
| 5,235,665 A | 8/1993 | Marchesi et al. |
| 5,259,051 A | 11/1993 | Burack et al. |
| 5,274,729 A | 12/1993 | King et al. |
| 5,274,731 A | 12/1993 | White |
| 5,287,425 A | 2/1994 | Chang |
| 5,289,558 A | 2/1994 | Teichler et al. |
| 5,292,390 A | 3/1994 | Burack et al. |
| 5,317,663 A | 5/1994 | Beard et al. |
| 5,318,259 A | 6/1994 | Fussler |
| 5,323,478 A | 6/1994 | Milanowski et al. |
| 5,327,513 A | 7/1994 | Nguyen et al. |
| 5,333,221 A | 7/1994 | Briggs et al. |
| 5,333,222 A | 7/1994 | Belenkiy et al. |
| 5,335,349 A | 8/1994 | Kutsch et al. |
| 5,353,367 A | 10/1994 | Czosnowsk et al. |
| 5,359,688 A | 10/1994 | Underwood |
| 5,363,440 A | 11/1994 | Daoud |
| 5,363,465 A | 11/1994 | Korkowski et al. |
| 5,363,467 A | 11/1994 | Keith |
| 5,367,598 A | 11/1994 | Devenish, III et al. |
| 5,402,515 A | 3/1995 | Vidacovich et al. |
| 5,408,557 A | 4/1995 | Hsu |
| RE34,955 E | 5/1995 | Anton et al. |
| 5,412,751 A | 5/1995 | Siemon et al. |
| 5,420,958 A | 5/1995 | Henson et al. |
| 5,430,823 A | 7/1995 | Dupont et al. |
| 5,432,875 A | 7/1995 | Korkowski et al. |
| 5,438,641 A | 8/1995 | Malacarne |
| 5,442,726 A | 8/1995 | Howard et al. |
| 5,448,015 A | 9/1995 | Jamet et al. |
| 5,453,827 A | 9/1995 | Lee |
| 5,461,690 A | 10/1995 | Lampert |
| 5,469,526 A | 11/1995 | Rawlings |
| 5,475,215 A | 12/1995 | Hsu |
| 5,488,682 A | 1/1996 | Sauter et al. |
| 5,490,229 A | 2/1996 | Ghandeharizadeh et al. |
| 5,497,444 A | 3/1996 | Wheeler |
| 5,509,096 A | 4/1996 | Easley |
| 5,511,144 A | 4/1996 | Hawkins et al. |
| 5,521,992 A | 5/1996 | Chun et al. |
| 5,530,783 A | 6/1996 | Belopolsky et al. |
| 5,542,015 A | 7/1996 | Hultermans |
| 5,548,678 A | 8/1996 | Frost et al. |
| 5,570,450 A | 10/1996 | Fernandez et al. |
| 5,588,076 A | 12/1996 | Peacock et al. |
| 5,613,030 A | 3/1997 | Hoffer et al. |
| 5,636,138 A | 6/1997 | Gilbert et al. |
| 5,636,310 A | 6/1997 | Walles |
| 5,647,043 A | 7/1997 | Anderson et al. |
| 5,655,044 A | 8/1997 | Finzel et al. |
| 5,664,037 A | 9/1997 | Weidman |
| 5,682,452 A | 10/1997 | Takahashi |
| 5,687,266 A | 11/1997 | Leyssens et al. |
| 5,689,604 A | 11/1997 | Janus et al. |
| 5,708,751 A | 1/1998 | Mattei |
| 5,708,753 A | 1/1998 | Frigo et al. |
| 5,715,348 A | 2/1998 | Falkenberg et al. |
| 5,717,810 A | 2/1998 | Wheeler |
| 5,727,097 A | 3/1998 | Lee et al. |
| 5,734,776 A | 3/1998 | Puetz |
| 5,734,777 A | 3/1998 | Merriken et al. |
| 5,742,480 A | 4/1998 | Sawada et al. |
| 5,754,720 A | 5/1998 | Quinn et al. |
| 5,758,002 A | 5/1998 | Walters |
| 5,758,003 A | 5/1998 | Wheeler et al. |
| 5,764,839 A | 6/1998 | Igl et al. |
| 5,764,844 A | 6/1998 | Mendes |
| 5,774,245 A | 6/1998 | Baker |
| 5,774,612 A | 6/1998 | Belenkiy et al. |
| 5,781,686 A | 7/1998 | Robinson et al. |
| 5,784,515 A | 7/1998 | Tamaru et al. |
| 5,823,646 A | 10/1998 | Arizpe et al. |
| 5,825,955 A | 10/1998 | Ernst et al. |
| 5,841,917 A | 11/1998 | Jungerman et al. |
| 5,870,519 A | 2/1999 | Jenkins et al. |
| 5,878,179 A | 3/1999 | Schricker |
| 5,883,995 A | 3/1999 | Lu |
| 5,887,095 A | 3/1999 | Nagase et al. |
| 5,889,910 A | 3/1999 | Igl et al. |
| 5,898,811 A | 4/1999 | DiGiovanni et al. |
| 5,903,698 A | 5/1999 | Poremba et al. |
| 5,905,829 A | 5/1999 | Maenishi et al. |
| 5,909,526 A | 6/1999 | Roth et al. |
| 5,917,976 A | 6/1999 | Yamaguchi |
| 5,917,980 A | 6/1999 | Yoshimura et al. |
| 5,930,425 A | 7/1999 | Abel et al. |
| 5,945,633 A | 8/1999 | Ott et al. |
| 5,956,444 A | 9/1999 | Duda et al. |
| 5,966,492 A | 10/1999 | Bechamps et al. |
| 5,969,294 A | 10/1999 | Eberle et al. |
| 5,970,196 A | 10/1999 | Greveling et al. |
| 5,971,626 A | 10/1999 | Knodell et al. |
| 5,974,214 A | 10/1999 | Shacklette et al. |
| 5,975,769 A | 11/1999 | Larson et al. |
| 5,981,064 A | 11/1999 | Burack et al. |
| 5,987,203 A | 11/1999 | Abel et al. |
| 6,005,991 A | 12/1999 | Knasel |
| 6,012,852 A | 1/2000 | Kadar-Kallen et al. |
| 6,022,150 A | 2/2000 | Erdman et al. |
| 6,027,252 A | 2/2000 | Erdman et al. |
| 6,041,155 A | 3/2000 | Anderson et al. |
| 6,044,193 A | 3/2000 | Szentesi et al. |
| 6,061,492 A | 5/2000 | Strause et al. |
| 6,076,975 A | 6/2000 | Roth |
| 6,079,881 A | 6/2000 | Roth |
| 6,097,872 A | 8/2000 | Kusuda et al. |
| 6,149,315 A | 11/2000 | Stephenson |

(56) References Cited

U.S. PATENT DOCUMENTS

| | | |
|---|---|---|
| 6,157,766 A | 12/2000 | Laniepce et al. |
| 6,160,946 A | 12/2000 | Thompson et al. |
| 6,167,183 A | 12/2000 | Swain |
| 6,181,845 B1 | 1/2001 | Horsthuis et al. |
| 6,185,348 B1 | 2/2001 | Shahid |
| 6,188,687 B1 | 2/2001 | Mussman et al. |
| 6,188,825 B1 | 2/2001 | Bandy et al. |
| 6,205,278 B1 | 3/2001 | Sjolinder |
| 6,208,779 B1 | 3/2001 | Rowlette, Sr. et al. |
| 6,208,796 B1 | 3/2001 | Williams Vigliaturo |
| 6,215,938 B1 | 4/2001 | Reitmeier et al. |
| 6,222,976 B1 | 4/2001 | Shahid |
| 6,224,269 B1 | 5/2001 | Engstrand et al. |
| 6,226,431 B1 | 5/2001 | Brown et al. |
| 6,227,717 B1 | 5/2001 | Ott et al. |
| 6,229,933 B1 | 5/2001 | Curzio et al. |
| 6,229,942 B1 | 5/2001 | Engberg et al. |
| 6,234,683 B1 | 5/2001 | Waldron et al. |
| 6,236,795 B1 | 5/2001 | Rodgers |
| 6,240,229 B1 | 5/2001 | Roth |
| 6,256,443 B1 | 7/2001 | Uruno et al. |
| 6,259,844 B1 | 7/2001 | Logan et al. |
| 6,269,214 B1 | 7/2001 | Naudin et al. |
| 6,271,484 B1 | 8/2001 | Tokutsu |
| 6,278,829 B1 | 8/2001 | BuAbbud et al. |
| 6,301,413 B1 | 10/2001 | Bringuier |
| 6,304,690 B1 | 10/2001 | Day |
| 6,317,533 B1 | 11/2001 | Slater et al. |
| RE37,489 E | 1/2002 | Anton et al. |
| 6,338,975 B1 | 1/2002 | Yoshimura et al. |
| 6,347,888 B1 | 2/2002 | Puetz |
| 6,351,590 B1 | 2/2002 | Shahid |
| 6,352,374 B1 | 3/2002 | Selfridge et al. |
| 6,356,690 B1 | 3/2002 | McAlpine et al. |
| 6,356,697 B1 | 3/2002 | Braga et al. |
| 6,360,050 B1 | 3/2002 | Moua et al. |
| 6,363,200 B1 | 3/2002 | Thompson et al. |
| 6,377,738 B1 | 4/2002 | Anderson et al. |
| 6,385,381 B1 | 5/2002 | Janus et al. |
| 6,411,767 B1 | 6/2002 | Burrous et al. |
| 6,419,399 B1 | 7/2002 | Loder et al. |
| 6,424,781 B1 | 7/2002 | Puetz et al. |
| 6,425,694 B1 | 7/2002 | Szilagyi et al. |
| 6,431,762 B1 | 8/2002 | Taira et al. |
| 6,434,313 B1 | 8/2002 | Clapp, Jr. et al. |
| 6,442,322 B1 | 8/2002 | Chen et al. |
| 6,442,323 B1 | 8/2002 | Sorosiak |
| 6,445,866 B1 | 9/2002 | Clairadin et al. |
| 6,452,925 B1 | 9/2002 | Sistanizadeh et al. |
| 6,453,033 B1 | 9/2002 | Little et al. |
| 6,464,402 B1 | 10/2002 | Andrews et al. |
| 6,464,404 B1 | 10/2002 | Robinson et al. |
| D466,087 S | 11/2002 | Cuny et al. |
| 6,480,487 B1 | 11/2002 | Wegleitner et al. |
| 6,480,661 B2 | 11/2002 | Kadar-Kallen et al. |
| 6,483,977 B2 | 11/2002 | Battey et al. |
| 6,493,480 B1 | 12/2002 | Lelic |
| 6,496,638 B1 | 12/2002 | Andersen |
| 6,496,640 B1 | 12/2002 | Harvey et al. |
| 6,504,988 B1 | 1/2003 | Trebesch et al. |
| 6,510,273 B2 | 1/2003 | Ali et al. |
| 6,526,210 B1 | 2/2003 | Harrison et al. |
| 6,532,332 B2 | 3/2003 | Solheid et al. |
| 6,535,682 B1 | 3/2003 | Puetz et al. |
| 6,537,106 B1 | 3/2003 | Follingstad |
| 6,539,147 B1 | 3/2003 | Mahony |
| 6,539,160 B2 | 3/2003 | Battey et al. |
| 6,542,688 B1 | 4/2003 | Battey et al. |
| 6,547,445 B2 | 4/2003 | Kiani |
| 6,547,450 B2 | 4/2003 | Lampert |
| 6,554,483 B1 | 4/2003 | Sun et al. |
| 6,554,485 B1 | 4/2003 | Beatty et al. |
| 6,556,763 B1 | 4/2003 | Puet et al. |
| 6,573,451 B2 | 6/2003 | Komiya et al. |
| 6,577,595 B1 | 6/2003 | Counterman |
| 6,591,051 B2 | 7/2003 | Solheid et al. |
| 6,594,434 B1 | 7/2003 | Davidson et al. |
| 6,594,436 B2 | 7/2003 | Sun et al. |
| 6,597,670 B1 | 7/2003 | Tweedy et al. |
| 6,600,860 B2 | 7/2003 | Sun et al. |
| 6,600,866 B2 | 7/2003 | Gatica et al. |
| 6,614,980 B1 | 9/2003 | Mahony |
| 6,619,853 B2 | 9/2003 | Grois et al. |
| 6,621,975 B2 | 9/2003 | Laporte et al. |
| 6,623,170 B2 | 9/2003 | Petrillo |
| 6,625,375 B1 | 9/2003 | Mahony |
| 6,628,866 B1 | 9/2003 | Wilson et al. |
| 6,631,237 B2 | 10/2003 | Knudsen et al. |
| RE38,311 E | 11/2003 | Wheeler |
| 6,648,376 B2 | 11/2003 | Christianson |
| 6,654,536 B2 | 11/2003 | Battey et al. |
| 6,661,961 B1 | 12/2003 | Allen et al. |
| 6,668,124 B2 | 12/2003 | Kondo et al. |
| 6,668,127 B1 | 12/2003 | Mahony |
| 6,688,780 B2 | 2/2004 | Duran |
| 6,690,862 B1 | 2/2004 | Rietveld |
| 6,690,867 B2 | 2/2004 | Melton et al. |
| 6,697,560 B1 | 2/2004 | Kondo et al. |
| 6,709,607 B2 | 3/2004 | Hibbs-Brenner et al. |
| 6,711,339 B2 | 3/2004 | Puetz et al. |
| 6,736,670 B2 | 5/2004 | Clark et al. |
| 6,755,574 B2 | 6/2004 | Fujiwara et al. |
| 6,760,530 B1 | 7/2004 | Mandry |
| 6,760,531 B1 | 7/2004 | Solheid et al. |
| 6,761,585 B2 | 7/2004 | Clark et al. |
| 6,763,166 B2 | 7/2004 | Yow, Jr. et al. |
| 6,764,221 B1 | 7/2004 | de Jong et al. |
| 6,768,860 B2 | 7/2004 | Liberty |
| 6,775,458 B2 | 8/2004 | Yow, Jr. et al. |
| 6,778,752 B2 | 8/2004 | Laporte et al. |
| 6,779,906 B1 | 8/2004 | Delmar |
| 6,788,786 B1 | 9/2004 | Kessler et al. |
| 6,788,846 B2 | 9/2004 | Hileman et al. |
| 6,792,190 B2 | 9/2004 | Xin et al. |
| 6,792,191 B1 | 9/2004 | Clapp, Jr. et al. |
| 6,793,399 B1 | 9/2004 | Nguyen |
| 6,793,517 B2 | 9/2004 | Neer et al. |
| 6,796,717 B2 | 9/2004 | Petrillo |
| 6,801,680 B2 | 10/2004 | Lin |
| 6,808,444 B1 | 10/2004 | Kuprin et al. |
| 6,810,193 B1 | 10/2004 | Muller |
| 6,815,612 B2 | 11/2004 | Bloodworth et al. |
| 6,819,821 B2 | 11/2004 | Lacey et al. |
| 6,843,606 B2 | 1/2005 | Deane et al. |
| 6,845,207 B2 | 1/2005 | Schray |
| 6,845,208 B2 | 1/2005 | Thibault et al. |
| 6,850,671 B2 | 2/2005 | Carnevale et al. |
| 6,850,685 B2 | 2/2005 | Tinucci et al. |
| 6,853,795 B2 | 2/2005 | Dagley et al. |
| 6,865,330 B2 | 3/2005 | Lecomte et al. |
| 6,870,734 B2 | 3/2005 | Mertesdorf et al. |
| 6,873,773 B2 | 3/2005 | Sun et al. |
| 6,888,069 B1 | 5/2005 | Chen et al. |
| 6,901,200 B2 | 5/2005 | Schray |
| 6,909,833 B2 | 6/2005 | Henschel et al. |
| 6,912,349 B2 | 6/2005 | Clark et al. |
| 6,916,199 B2 | 7/2005 | Follingstad |
| 6,920,213 B2 | 7/2005 | Pershan |
| 6,920,274 B2 | 7/2005 | Rapp et al. |
| 6,925,241 B2 | 8/2005 | Bohle et al. |
| 6,934,457 B2 | 8/2005 | Vincent et al. |
| 6,937,800 B2 | 8/2005 | Cote |
| 6,950,593 B2 | 9/2005 | Hodge et al. |
| 6,959,139 B2 | 10/2005 | Erwin et al. |
| 6,968,111 B2 | 11/2005 | Trebesch et al. |
| 6,980,725 B1 | 12/2005 | Swieconek |
| 6,983,095 B2 | 1/2006 | Reagan et al. |
| H2144 H | 2/2006 | Baechtle et al. |
| 7,006,748 B2 | 2/2006 | Dagley et al. |
| 7,018,113 B1 | 3/2006 | Wang et al. |
| 7,020,359 B2 | 3/2006 | Mayer |
| 7,029,322 B2 | 4/2006 | Ernst et al. |
| 7,058,245 B2 | 6/2006 | Farahi |
| 7,062,177 B1 | 6/2006 | Grivna et al. |

(56) References Cited

U.S. PATENT DOCUMENTS

| | | |
|---|---|---|
| 7,066,762 B2 | 6/2006 | Neer et al. |
| 7,066,771 B2 | 6/2006 | Clark et al. |
| 7,068,907 B2 | 6/2006 | Schray |
| 7,075,565 B1 | 7/2006 | Raymond et al. |
| 7,086,539 B2 | 8/2006 | Knudsen et al. |
| 7,088,899 B2 | 8/2006 | Reagan et al. |
| 7,090,084 B2 | 8/2006 | Knudsen et al. |
| 7,092,592 B2 | 8/2006 | Verhagen et al. |
| 7,094,095 B1 | 8/2006 | Caveney |
| 7,102,884 B2 | 9/2006 | Mertesdorf et al. |
| 7,103,255 B2 | 9/2006 | Reagan et al. |
| 7,113,686 B2 | 9/2006 | Bellekens et al. |
| 7,130,498 B2 | 10/2006 | Meis et al. |
| 7,139,456 B2 | 11/2006 | Sasaki et al. |
| 7,139,461 B2 | 11/2006 | Puetz et al. |
| 7,142,764 B2 | 11/2006 | Allen et al. |
| 7,142,765 B2 | 11/2006 | Rapp et al. |
| 7,146,089 B2 | 12/2006 | Reagan et al. |
| 7,149,398 B2 | 12/2006 | Solheid et al. |
| 7,171,102 B2 | 1/2007 | Reagan et al. |
| 7,179,119 B2 | 2/2007 | Follingstad |
| 7,186,032 B1 | 3/2007 | Stevens et al. |
| 7,194,181 B2 | 3/2007 | Holmberg et al. |
| 7,198,409 B2 | 4/2007 | Smith et al. |
| 7,200,317 B2 | 4/2007 | Reagan et al. |
| 7,218,827 B2 | 5/2007 | Vongseng et al. |
| 7,233,712 B2 | 6/2007 | Arellano |
| 7,233,731 B2 | 6/2007 | Solheid et al. |
| 7,241,182 B2 | 7/2007 | Clark et al. |
| 7,244,144 B2 | 7/2007 | Follingstad |
| 7,248,772 B2 | 7/2007 | Suzuki et al. |
| 7,277,620 B2 | 10/2007 | Vongseng et al. |
| 7,302,153 B2 | 11/2007 | Thom |
| 7,330,546 B2 | 2/2008 | Kessler et al. |
| 7,333,707 B2 | 2/2008 | Puetz et al. |
| 7,335,056 B1 | 2/2008 | Clark et al. |
| 7,346,254 B2 | 3/2008 | Kramer et al. |
| 7,352,921 B2 | 4/2008 | Saito et al. |
| 7,357,667 B2 | 4/2008 | Clark et al. |
| 7,367,823 B2 | 5/2008 | Rapp et al. |
| 7,369,741 B2 | 5/2008 | Reagan et al. |
| 7,376,321 B2 | 5/2008 | Bolster et al. |
| 7,376,322 B2 | 5/2008 | Zimmel et al. |
| 7,376,323 B2 | 5/2008 | Zimmel |
| 7,377,697 B2 | 5/2008 | Kahle et al. |
| 7,391,952 B1 | 6/2008 | Ugolini et al. |
| 7,400,813 B2 | 7/2008 | Zimmel |
| 7,400,816 B2 | 7/2008 | Reagan et al. |
| 7,406,240 B2 | 7/2008 | Murano |
| 7,407,330 B2 | 8/2008 | Smith et al. |
| 7,408,769 B2 | 8/2008 | Mertesdorf et al. |
| 7,412,147 B2 | 8/2008 | Scadden |
| 7,416,349 B2 | 8/2008 | Kramer |
| 7,418,181 B2 | 8/2008 | Zimmel et al. |
| 7,433,915 B2 | 10/2008 | Edwards et al. |
| 7,455,548 B2 | 11/2008 | Clark et al. |
| 7,457,503 B2 | 11/2008 | Solheid et al. |
| 7,460,757 B2 | 12/2008 | Hoehne et al. |
| 7,471,869 B2 | 12/2008 | Reagan et al. |
| 7,493,002 B2 | 2/2009 | Coburn et al. |
| 7,493,044 B2 | 2/2009 | Kozischek et al. |
| 7,496,268 B2 | 2/2009 | Escoto et al. |
| 7,515,805 B2 | 4/2009 | Vongseng et al. |
| 7,519,259 B2 | 4/2009 | Smith et al. |
| 7,532,782 B2 | 5/2009 | Bragg et al. |
| 7,534,135 B2 | 5/2009 | Follingstad |
| 7,543,993 B2 | 6/2009 | Blauvelt et al. |
| 7,544,090 B2 | 6/2009 | Follingstad |
| 7,553,091 B2 | 6/2009 | McColloch |
| 7,555,193 B2 | 6/2009 | Rapp et al. |
| 7,623,749 B2 | 11/2009 | Reagan et al. |
| 7,627,204 B1 | 12/2009 | Deane |
| 7,646,958 B1 | 1/2010 | Reagan et al. |
| 7,668,427 B2 | 2/2010 | Register |
| 7,686,658 B2 | 3/2010 | Clark et al. |
| 7,689,089 B2 | 3/2010 | Wagner et al. |
| 7,706,656 B2 | 4/2010 | Zimmel |
| 7,722,261 B2 | 5/2010 | Kadar-Kallen et al. |
| 7,738,755 B2 | 6/2010 | Shioda |
| 7,738,760 B2 | 6/2010 | Fredrickson et al. |
| 7,747,125 B1 | 6/2010 | Lee et al. |
| RE41,460 E | 7/2010 | Wheeler |
| 7,751,674 B2 | 7/2010 | Hill |
| 7,756,371 B1 | 7/2010 | Burnham et al. |
| 7,773,843 B2 | 8/2010 | Cody et al. |
| 7,775,725 B2 | 8/2010 | Grinderslev |
| 7,805,043 B2 | 9/2010 | Puetz et al. |
| 7,809,232 B2 | 10/2010 | Reagan et al. |
| 7,809,233 B2 | 10/2010 | Smith et al. |
| 7,809,234 B2 | 10/2010 | Smith et al. |
| 7,809,235 B2 | 10/2010 | Reagan et al. |
| 7,822,313 B2 | 10/2010 | Rapp et al. |
| 7,826,706 B2 | 11/2010 | Vongseng et al. |
| 7,841,775 B2 | 11/2010 | Smith et al. |
| 7,844,159 B2 | 11/2010 | Solheid et al. |
| 7,844,161 B2 | 11/2010 | Reagan et al. |
| 7,856,166 B2 | 12/2010 | Biribuze et al. |
| 7,873,255 B2 | 1/2011 | Reagan et al. |
| 7,889,961 B2 | 2/2011 | Cote et al. |
| 7,934,948 B2 | 5/2011 | Follingstad |
| 7,942,004 B2 | 5/2011 | Hodder |
| 7,945,138 B2 | 5/2011 | Hill et al. |
| 7,961,999 B2 | 6/2011 | Frohlich et al. |
| 7,983,521 B2 | 7/2011 | Rapp et al. |
| 8,019,192 B2 | 9/2011 | Puetz et al. |
| 8,032,032 B2 | 10/2011 | Chand et al. |
| 8,041,221 B2 | 10/2011 | Elberbaum |
| 8,059,932 B2 | 11/2011 | Hill et al. |
| 8,078,017 B2 | 12/2011 | Kodama et al. |
| 8,085,472 B2 | 12/2011 | Kadar-Kallen |
| 8,113,723 B2 | 2/2012 | Togami et al. |
| 8,139,913 B2 | 3/2012 | Bolster et al. |
| 8,184,938 B2 | 5/2012 | Cooke et al. |
| 8,195,022 B2 | 6/2012 | Coburn et al. |
| 8,280,205 B2 | 10/2012 | Erdman et al. |
| 8,280,216 B2 | 10/2012 | Cooke et al. |
| 8,292,518 B2 | 10/2012 | Togami et al. |
| 8,313,249 B2 | 11/2012 | Gurreri et al. |
| 8,342,755 B2 | 1/2013 | Nhep |
| 8,358,900 B2 | 1/2013 | Rapp et al. |
| 8,374,477 B2 | 2/2013 | Hill |
| 8,406,587 B2 | 3/2013 | Mudd et al. |
| 8,417,074 B2 | 4/2013 | Nhep et al. |
| 8,428,418 B2 | 4/2013 | Smrha |
| 8,457,458 B2 | 6/2013 | Kadar-Kallen et al. |
| 8,463,091 B2 | 6/2013 | Kewitsch |
| 8,466,848 B2 | 6/2013 | Guy et al. |
| 8,485,737 B2 | 7/2013 | Kolesar |
| 8,588,566 B2 | 11/2013 | Matsuyama et al. |
| 8,600,208 B2 | 12/2013 | Badar et al. |
| 8,649,648 B2 | 2/2014 | Coburn et al. |
| 8,690,593 B2 | 4/2014 | Anderson et al. |
| 8,693,836 B2 | 4/2014 | Kimbrell et al. |
| 8,712,206 B2 | 4/2014 | Cooke et al. |
| 8,886,335 B2 | 11/2014 | Pianca et al. |
| 9,011,020 B2 | 4/2015 | Ty Tan et al. |
| 9,031,360 B2 | 5/2015 | Schneider et al. |
| 9,075,216 B2 | 7/2015 | Cote et al. |
| 9,091,818 B2 | 7/2015 | Kadar-Kallen |
| 9,154,860 B2 * | 10/2015 | Hessong ............ H04Q 11/0005 |
| 9,223,094 B2 | 12/2015 | Schneider et al. |
| 9,229,172 B2 | 1/2016 | Eberle, Jr. |
| 9,329,353 B2 | 5/2016 | Solheid et al. |
| 9,341,786 B1 | 5/2016 | Gamache et al. |
| 9,354,416 B2 | 5/2016 | Solheid et al. |
| 9,417,418 B2 | 8/2016 | Eberle, Jr. et al. |
| 9,488,788 B2 | 11/2016 | Murray et al. |
| 9,753,229 B2 | 9/2017 | Murray et al. |
| 9,874,711 B2 | 1/2018 | Schneider et al. |
| 9,897,767 B2 | 2/2018 | Murray et al. |
| 10,031,295 B2 | 7/2018 | Eberle, Jr. et al. |
| 10,067,295 B2 | 9/2018 | Eberle, Jr. |
| 10,149,619 B2 | 12/2018 | Ito et al. |
| 10,209,454 B2 | 2/2019 | Isenhour et al. |

(56) References Cited

U.S. PATENT DOCUMENTS

| | | |
|---|---|---|
| 10,295,761 B2 | 5/2019 | Murray et al. |
| 10,317,638 B2 | 6/2019 | Schneider et al. |
| 10,379,311 B1 | 8/2019 | Krywicki et al. |
| 10,451,809 B2 | 10/2019 | Eberle, Jr. et al. |
| 10,620,382 B2 | 4/2020 | Eberle, Jr. |
| 10,739,534 B2 | 8/2020 | Murray et al. |
| 10,754,096 B2 | 8/2020 | Murray et al. |
| 10,782,483 B2 | 9/2020 | Eberle, Jr. et al. |
| 10,955,633 B2 | 3/2021 | Schneider et al. |
| 11,036,012 B2 | 6/2021 | Murray et al. |
| 11,372,165 B2 | 6/2022 | Eberle, Jr. et al. |
| 11,409,068 B2 | 8/2022 | Marcouiller et al. |
| 2001/0009136 A1 | 7/2001 | Bryning et al. |
| 2001/0041025 A1 | 11/2001 | Farahi |
| 2002/0015563 A1 | 2/2002 | Murakami et al. |
| 2002/0034290 A1 | 3/2002 | Pershan |
| 2002/0090191 A1 | 7/2002 | Sorosiak |
| 2002/0097962 A1 | 7/2002 | Yoshimura et al. |
| 2002/0102088 A1 | 8/2002 | Kondo et al. |
| 2002/0131719 A1 | 9/2002 | Grois et al. |
| 2002/0150372 A1 | 10/2002 | Schray et al. |
| 2002/0174691 A1 | 11/2002 | Arishima et al. |
| 2002/0181893 A1 | 12/2002 | White et al. |
| 2002/0181922 A1 | 12/2002 | Xin et al. |
| 2002/0186954 A1 | 12/2002 | Liu et al. |
| 2003/0002812 A1 | 1/2003 | Lampert |
| 2003/0007742 A1 | 1/2003 | Kowatsch |
| 2003/0007767 A1 | 1/2003 | Douglas et al. |
| 2003/0031436 A1 | 2/2003 | Simmons et al. |
| 2003/0031452 A1 | 2/2003 | Simmons et al. |
| 2003/0042040 A1 | 3/2003 | Komiya et al. |
| 2003/0044141 A1 | 3/2003 | Melton et al. |
| 2003/0059526 A1 | 3/2003 | Benson et al. |
| 2003/0072535 A1 | 4/2003 | Sun et al. |
| 2003/0072537 A1 | 4/2003 | Eichenberger et al. |
| 2003/0095772 A1 | 5/2003 | Solheid et al. |
| 2003/0128951 A1 | 7/2003 | Lecomte et al. |
| 2003/0138187 A1 | 7/2003 | Kawase et al. |
| 2003/0142949 A1 | 7/2003 | Hicks et al. |
| 2003/0147597 A1 | 8/2003 | Duran |
| 2003/0165315 A1 | 9/2003 | Trebesch et al. |
| 2003/0169570 A1 | 9/2003 | Brebner et al. |
| 2003/0174953 A1 | 9/2003 | Carnevale et al. |
| 2003/0174996 A1 | 9/2003 | Henschel et al. |
| 2003/0180012 A1 | 9/2003 | Deane et al. |
| 2003/0182015 A1 | 9/2003 | Domaille et al. |
| 2003/0198427 A1 | 10/2003 | Bragg et al. |
| 2003/0223724 A1 | 12/2003 | Puetz et al. |
| 2004/0028368 A1 | 2/2004 | Hileman et al. |
| 2004/0033007 A1 | 2/2004 | Ohtsu et al. |
| 2004/0062488 A1 | 4/2004 | Wood |
| 2004/0074852 A1 | 4/2004 | Knudsen et al. |
| 2004/0109660 A1 | 6/2004 | Liberty |
| 2004/0114874 A1 | 6/2004 | Bono et al. |
| 2004/0126069 A1 | 7/2004 | Jong et al. |
| 2004/0136638 A1 | 7/2004 | Baechtle et al. |
| 2004/0161212 A1 | 8/2004 | Sun et al. |
| 2004/0165852 A1 | 8/2004 | Erwin et al. |
| 2004/0172492 A1 | 9/2004 | Farnworth et al. |
| 2004/0175090 A1 | 9/2004 | Vastmans et al. |
| 2004/0179771 A1 | 9/2004 | Verhagen et al. |
| 2004/0213505 A1 | 10/2004 | Saito et al. |
| 2004/0228598 A1 | 11/2004 | Allen et al. |
| 2004/0264873 A1 | 12/2004 | Smith et al. |
| 2005/0002633 A1 | 1/2005 | Solheid et al. |
| 2005/0003697 A1 | 1/2005 | Neer et al. |
| 2005/0018950 A1 | 1/2005 | Arellano |
| 2005/0023656 A1 | 2/2005 | Leedy |
| 2005/0048831 A1 | 3/2005 | Neer et al. |
| 2005/0053337 A1 | 3/2005 | Mayer |
| 2005/0084200 A1 | 4/2005 | Meis et al. |
| 2005/0111801 A1 | 5/2005 | Garman et al. |
| 2005/0123261 A1 | 6/2005 | Bellekens et al. |
| 2005/0129379 A1 | 6/2005 | Reagan et al. |
| 2005/0226566 A1 | 10/2005 | Sasaki et al. |
| 2006/0029353 A1 | 2/2006 | Bolster et al. |
| 2006/0088258 A1 | 4/2006 | Sasaki et al. |
| 2006/0093274 A1 | 5/2006 | Kahle et al. |
| 2006/0093301 A1 | 5/2006 | Zimmel et al. |
| 2006/0098914 A1 | 5/2006 | Tourne |
| 2006/0165366 A1 | 7/2006 | Feustel et al. |
| 2006/0177175 A1 | 8/2006 | Mayer et al. |
| 2006/0210222 A1 | 9/2006 | Watte et al. |
| 2006/0210229 A1 | 9/2006 | Scadden |
| 2006/0228086 A1 | 10/2006 | Holmberg et al. |
| 2006/0245756 A1 | 11/2006 | Kozischek et al. |
| 2006/0257657 A1 | 11/2006 | Curran et al. |
| 2006/0269205 A1 | 11/2006 | Zimmel |
| 2006/0269206 A1 | 11/2006 | Zimmel |
| 2007/0003204 A1 | 1/2007 | Makrides-Saravanos et al. |
| 2007/0025672 A1 | 2/2007 | Suzuki et al. |
| 2007/0025675 A1 | 2/2007 | Kramer |
| 2007/0047893 A1 | 3/2007 | Kramer et al. |
| 2007/0086694 A1 | 4/2007 | Murphy et al. |
| 2007/0189692 A1 | 8/2007 | Zimmel et al. |
| 2007/0206902 A1 | 9/2007 | Blauvelt et al. |
| 2007/0230863 A1 | 10/2007 | Fukuda et al. |
| 2007/0237449 A1 | 10/2007 | Aoki et al. |
| 2007/0239232 A1 | 10/2007 | Kurtz et al. |
| 2008/0008436 A1 | 1/2008 | Reagan et al. |
| 2008/0008437 A1 | 1/2008 | Reagan et al. |
| 2008/0017985 A1 | 1/2008 | Kilger |
| 2008/0019655 A1 | 1/2008 | Vongseng et al. |
| 2008/0025684 A1 | 1/2008 | Vongseng et al. |
| 2008/0089656 A1 | 4/2008 | Wagner et al. |
| 2008/0095501 A1 | 4/2008 | McColloch |
| 2008/0124038 A1 | 5/2008 | Kowalczyk et al. |
| 2008/0131067 A1 | 6/2008 | Ugolini et al. |
| 2008/0145011 A1 | 6/2008 | Register |
| 2008/0175548 A1 | 7/2008 | Knecht et al. |
| 2008/0175550 A1 | 7/2008 | Coburn et al. |
| 2008/0187276 A1 | 8/2008 | Roberts et al. |
| 2008/0273846 A1 | 11/2008 | Register |
| 2008/0298748 A1 | 12/2008 | Cox et al. |
| 2008/0310854 A1 | 12/2008 | Takai et al. |
| 2008/0317425 A1 | 12/2008 | Smith et al. |
| 2009/0041417 A1 | 2/2009 | Rapp et al. |
| 2009/0046985 A1 | 2/2009 | Gronvall et al. |
| 2009/0067800 A1 | 3/2009 | Vazquez et al. |
| 2009/0067802 A1 | 3/2009 | Hoehne et al. |
| 2009/0074372 A1 | 3/2009 | Solheid et al. |
| 2009/0087157 A1 | 4/2009 | Smith et al. |
| 2009/0097797 A1 | 4/2009 | Kewitsch |
| 2009/0097800 A1 | 4/2009 | Gurreri et al. |
| 2009/0097813 A1 | 4/2009 | Hill |
| 2009/0134318 A1 | 5/2009 | Kuniyoshi et al. |
| 2009/0142026 A1 | 6/2009 | Shioda |
| 2009/0180737 A1 | 7/2009 | Burnham et al. |
| 2009/0190896 A1 | 7/2009 | Smith et al. |
| 2009/0196563 A1 | 8/2009 | Mullsteff et al. |
| 2009/0196565 A1 | 8/2009 | Vongseng et al. |
| 2009/0245743 A1 | 10/2009 | Cote et al. |
| 2009/0257726 A1 | 10/2009 | Redmann et al. |
| 2009/0269018 A1 | 10/2009 | Frohlich et al. |
| 2009/0274431 A1 | 11/2009 | Krampotich et al. |
| 2009/0285540 A1 | 11/2009 | Reagan et al. |
| 2009/0290843 A1 | 11/2009 | Reagan et al. |
| 2009/0297111 A1 | 12/2009 | Reagan et al. |
| 2009/0324189 A1 | 12/2009 | Hill et al. |
| 2010/0054683 A1 | 3/2010 | Cooke et al. |
| 2010/0086260 A1 | 4/2010 | Parikh et al. |
| 2010/0124421 A1 | 5/2010 | Chand et al. |
| 2010/0129028 A1 | 5/2010 | Nhep et al. |
| 2010/0142910 A1 | 6/2010 | Hill et al. |
| 2010/0158465 A1 | 6/2010 | Smrha |
| 2010/0166370 A1 | 7/2010 | Cody et al. |
| 2010/0195955 A1 | 8/2010 | Burnham et al. |
| 2010/0238428 A1 | 9/2010 | Glines et al. |
| 2010/0296790 A1 | 11/2010 | Cooke et al. |
| 2010/0298895 A1 | 11/2010 | Ghaffari et al. |
| 2010/0316334 A1 | 12/2010 | Kewitsch |
| 2010/0316335 A1 | 12/2010 | Furuyama |
| 2010/0322562 A1 | 12/2010 | Barnes et al. |
| 2010/0322576 A1 | 12/2010 | Rhoney et al. |

(56) References Cited

U.S. PATENT DOCUMENTS

| | | |
|---|---|---|
| 2010/0322577 A1 | 12/2010 | Bolster et al. |
| 2010/0322579 A1 | 12/2010 | Cooke et al. |
| 2010/0329620 A1 | 12/2010 | Griffiths et al. |
| 2011/0002586 A1 | 1/2011 | Nhep |
| 2011/0019964 A1 | 1/2011 | Nhep et al. |
| 2011/0034912 A1 | 2/2011 | de Graff et al. |
| 2011/0044599 A1 | 2/2011 | Kowalczyk et al. |
| 2011/0065909 A1 | 3/2011 | Lange et al. |
| 2011/0081114 A1 | 4/2011 | Togami et al. |
| 2011/0085764 A1 | 4/2011 | Greub et al. |
| 2011/0085771 A1 | 4/2011 | Matsuyama et al. |
| 2011/0096404 A1 | 4/2011 | Kadar-Kallen |
| 2011/0103748 A1 | 5/2011 | Ott |
| 2011/0103803 A1 | 5/2011 | Kolesar |
| 2011/0110673 A1 | 5/2011 | Elberbaum |
| 2011/0182558 A1 | 7/2011 | Garcia et al. |
| 2011/0217016 A1 | 9/2011 | Mullsteff |
| 2011/0222823 A1 | 9/2011 | Pitwon |
| 2011/0222829 A1 | 9/2011 | Loeffelholz et al. |
| 2011/0262077 A1 | 10/2011 | Anderson et al. |
| 2011/0268404 A1 | 11/2011 | Cote et al. |
| 2011/0268408 A1 | 11/2011 | Giraud et al. |
| 2011/0268410 A1 | 11/2011 | Giraud et al. |
| 2011/0268412 A1 | 11/2011 | Giraud et al. |
| 2011/0268414 A1 | 11/2011 | Giraud et al. |
| 2011/0274400 A1 | 11/2011 | Mudd et al. |
| 2011/0317973 A1 | 12/2011 | Rapp et al. |
| 2012/0002934 A1 | 1/2012 | Kimbrell et al. |
| 2012/0008900 A1 | 1/2012 | Schneider |
| 2012/0014645 A1 | 1/2012 | Kadar-Kallen |
| 2012/0020618 A1 | 1/2012 | Erdman et al. |
| 2012/0020619 A1 | 1/2012 | Kadar-Kallen et al. |
| 2012/0051706 A1 | 3/2012 | van Geffen et al. |
| 2012/0051708 A1 | 3/2012 | Badar et al. |
| 2012/0057838 A1 | 3/2012 | Hill et al. |
| 2012/0148198 A1 | 6/2012 | Togami et al. |
| 2012/0189259 A1 | 7/2012 | Manes |
| 2012/0213469 A1 | 8/2012 | Jia et al. |
| 2012/0263415 A1 | 10/2012 | Tan et al. |
| 2012/0276549 A1 | 11/2012 | Cunningham et al. |
| 2012/0288233 A1 | 11/2012 | Barnes et al. |
| 2012/0301098 A1 | 11/2012 | Benedetto et al. |
| 2012/0309080 A1 | 12/2012 | Cunningham et al. |
| 2013/0014936 A1 | 1/2013 | Griffith |
| 2013/0039616 A1 | 2/2013 | Shambat et al. |
| 2013/0064495 A1 | 3/2013 | Eberle, Jr. |
| 2013/0064506 A1 | 3/2013 | Eberle, Jr. et al. |
| 2013/0077913 A1 | 3/2013 | Schneider et al. |
| 2013/0089292 A1 | 4/2013 | Ott et al. |
| 2013/0148926 A1 | 6/2013 | Koshinz et al. |
| 2013/0148936 A1 | 6/2013 | Hill |
| 2013/0170797 A1 | 7/2013 | Ott |
| 2013/0287356 A1 | 10/2013 | Solheid et al. |
| 2013/0343700 A1 | 12/2013 | Kolesar |
| 2014/0086545 A1 | 3/2014 | Solheid et al. |
| 2014/0133810 A1 | 5/2014 | Schneider et al. |
| 2014/0205244 A1 | 7/2014 | Bradley |
| 2014/0212095 A1 | 7/2014 | Isenhour et al. |
| 2014/0270636 A1 | 9/2014 | Manes |
| 2014/0303452 A1 | 10/2014 | Ghaffari |
| 2015/0063773 A1 | 3/2015 | Beamon et al. |
| 2015/0253514 A1 | 9/2015 | Murray et al. |
| 2015/0260927 A1 | 9/2015 | Murray et al. |
| 2016/0259141 A1 | 9/2016 | Schneider et al. |
| 2017/0023740 A1* | 1/2017 | Kewitsch ........... G02B 6/44528 |
| 2017/0153399 A1 | 6/2017 | Rodriguez |
| 2019/0025521 A1 | 1/2019 | Geens et al. |
| 2020/0348471 A1 | 11/2020 | Murray et al. |
| 2020/0386949 A1 | 12/2020 | Eberle, Jr. |
| 2021/0011228 A1 | 1/2021 | Murray et al. |
| 2021/0072463 A1 | 3/2021 | Zitsch et al. |
| 2021/0263252 A1 | 8/2021 | Schneider et al. |
| 2021/0302669 A1 | 9/2021 | Murray et al. |

FOREIGN PATENT DOCUMENTS

| | | |
|---|---|---|
| CN | 1248329 A | 1/1998 |
| CN | 2426610 Y | 4/2001 |
| CN | 1277137 C | 9/2006 |
| CN | 102057306 A | 5/2011 |
| CN | 102272650 A | 12/2011 |
| CN | 104335091 A | 2/2015 |
| CN | 104823091 A | 8/2015 |
| DE | 27 35 106 A1 | 2/1979 |
| DE | 33 08 682 A1 | 9/1984 |
| DE | 42 07 531 A1 | 9/1992 |
| DE | 42 29 510 A1 | 3/1994 |
| EP | 0 146 478 A2 | 6/1985 |
| EP | 0 149 250 A2 | 7/1985 |
| EP | 0 196 102 A2 | 10/1986 |
| EP | 0 211 208 A1 | 2/1987 |
| EP | 0 293 183 A2 | 11/1988 |
| EP | 0 349 290 A1 | 1/1990 |
| EP | 0 406 151 A2 | 1/1991 |
| EP | 0 479 226 A1 | 4/1992 |
| EP | 0 196 102 B1 | 3/1993 |
| EP | 0 538 164 A1 | 4/1993 |
| EP | 0 585 809 A1 | 3/1994 |
| EP | 0 587 336 A2 | 3/1994 |
| EP | 0 697 610 A1 | 2/1996 |
| EP | 0 743 701 A1 | 11/1996 |
| EP | 0 788 002 A1 | 8/1997 |
| EP | 0 871 047 A1 | 10/1998 |
| EP | 0 563 995 B1 | 10/1999 |
| EP | 0 975 180 A1 | 1/2000 |
| EP | 1 045 267 A1 | 10/2000 |
| EP | 1 067 418 A1 | 1/2001 |
| EP | 1 102 095 A1 | 5/2001 |
| EP | 1 103 832 A2 | 5/2001 |
| EP | 1 162 487 A2 | 12/2001 |
| EP | 1 884 809 A1 | 2/2008 |
| EP | 2 365 364 B1 | 9/2018 |
| FR | 2 531 576 A1 | 2/1984 |
| FR | 2 587 127 A1 | 3/1987 |
| GB | 2 239 104 A | 6/1991 |
| GB | 2 367 902 A | 4/2002 |
| JP | 59-74523 A | 4/1984 |
| JP | 60-169811 A | 9/1985 |
| JP | 61-53076 A | 3/1986 |
| JP | 61-55607 A | 3/1986 |
| JP | 61-90104 A | 5/1986 |
| JP | 63-229409 A | 9/1988 |
| JP | H06-186438 A | 7/1994 |
| JP | H07-209526 A | 8/1995 |
| JP | H07-281052 A | 10/1995 |
| JP | H08-286081 A | 11/1996 |
| JP | H09-90171 A | 4/1997 |
| JP | H10-10368 A | 1/1998 |
| JP | H10-68853 A | 3/1998 |
| JP | H10-90526 A | 4/1998 |
| JP | H10-339818 A | 12/1998 |
| JP | 2001-255421 A | 9/2001 |
| JP | 2002-174736 A | 6/2002 |
| JP | 1144266 S | 6/2002 |
| JP | 2002-211945 A | 7/2002 |
| JP | 3307618 B2 | 7/2002 |
| JP | 2002-253341 A | 9/2002 |
| JP | 2002-254306 | 9/2002 |
| JP | 2002-311252 A | 10/2002 |
| JP | 3486062 B2 | 1/2004 |
| JP | 2004-109237 A | 4/2004 |
| JP | 2005-257887 A | 9/2005 |
| JP | 3761762 B2 | 3/2006 |
| JP | 2007-233144 A | 9/2007 |
| JP | 2007-318741 A | 12/2007 |
| JP | 2010-19895 | 1/2010 |
| JP | 2010-239535 A | 10/2010 |
| JP | 4749566 B2 | 5/2011 |
| JP | 2011-191333 A | 9/2011 |
| JP | 4851430 B2 | 1/2012 |
| JP | 4911130 B2 | 1/2012 |
| JP | 5899562 B2 | 4/2016 |
| KR | 10-2005-0034103 | 4/2005 |

(56) References Cited

FOREIGN PATENT DOCUMENTS

| WO | 90/09708 A1 | 8/1990 |
|---|---|---|
| WO | 91/10927 A1 | 7/1991 |
| WO | 94/17534 A1 | 8/1994 |
| WO | 95/20175 A1 | 7/1995 |
| WO | 98/36309 A1 | 8/1998 |
| WO | 98/53347 A2 | 11/1998 |
| WO | 99/13367 A2 | 3/1999 |
| WO | 99/27404 A1 | 6/1999 |
| WO | 99/46621 A1 | 9/1999 |
| WO | 00/05611 A2 | 2/2000 |
| WO | 00/07053 A2 | 2/2000 |
| WO | 00/52504 A2 | 9/2000 |
| WO | 03/093883 A2 | 11/2000 |
| WO | 00/75706 A2 | 12/2000 |
| WO | 01/61317 A1 | 8/2001 |
| WO | 01/75495 A2 | 10/2001 |
| WO | 02/21182 A1 | 3/2002 |
| WO | 02/103429 A2 | 12/2002 |
| WO | 03/021312 A1 | 3/2003 |
| WO | 2008/027201 A2 | 3/2008 |
| WO | 2008/089192 A1 | 7/2008 |
| WO | 2009/120280 A2 | 10/2009 |
| WO | 2011/094327 A1 | 8/2011 |
| WO | 2011/100613 A1 | 8/2011 |
| WO | 2013/106820 A1 | 7/2013 |
| WO | 2017/121778 A1 | 7/2017 |
| WO | 2019/070682 A2 | 4/2019 |
| WO | 2019195602 | 10/2019 |

OTHER PUBLICATIONS

International Search Report and Written Opinion of the International Searching Authority for International Patent Application No. PCT/US2021/025135 mailed Jul. 21, 2021, 9 pages.
"ADC OMX 600 Optical Distribution Frame Solution," ADC Telecommunications, Inc., Publication No. 856, 8 pgs. (Feb. 2000).
ADC Telecommunications brochure entitled "Fiber Cable Management Products, Second Edition," 144 pages, dated Oct. 1995.
ADC Telecommunications, Inc. brochure entitled "FL2000 Products," Publication No. 803, 51 pages (Nov. 1996).
ADC Telecommunications brochure entitled "Next Generation Frame (NGF) Product Family Ordering Guide," 22 pages, dated Oct. 1998.
ADC Telecommunications, Inc., brochure entitled "Value-Added Module (VAM) System: Monitor, Splitter, WDM and CWDM Modules and Chassis for Switching Office, Central Exchange and Headend Applications, 1st edition," Part No. 101663BE, 36 pages (Feb. 2008).
ADC Telecommunications, Inc., "Value-Added Module (VAM) System—Monitor, Splitter, WDM/CWDM/DWDM Modules and Chassis—5th Edition," Oct. 2009, 32 Pages.
ADC Telecommunications, Inc., 600 mm Products, Value-Added Module System, pp. 53-78 (Oct. 2003).
ADC Telecommunications, Inc., brochure entitled "Value-Added Module System," Publication No. 891, 29 pages (Apr. 2000).
ADC Telecommunications, Inc., brochure entitled "Value-Added Module System: Optical Distribution Frame (OMX™ 600)," Publication No. 891-OMX, 11 pages (Jan. 2002).
ADC Telecommunications, Inc., brochure entitled "Fiber Management Tray: 2 Rack Unit (2 RU) Style FMT-G Series," Publication No. 1258896, 8 pages (Mar. 2003).
ADC Telecommunications, Inc., FMT Micro Value Added Monitor Module Configuration Scheme, pp. 1-2 (Feb. 6, 2003).
ADC Telecommunications, Inc., Mini VAM Connector Cleaning Instructions, ADCP-90-412, Issue 3, pp. 1-8 (Sep. 2002).
ADC Telecommunications, Inc., Mini VAM Splitter Mod (Installation Drawing), Drawing No. 1128185, 2 pages (Mar. 14, 2001).
ADC Telecommunications, Inc., Next Generation Frame (NGF) Product Tour, Value Added Modules (VAMs), Copyright 2003, 1 page, (admitted as offered for sale as of Apr. 25, 2006).

ADC Telecommunications, Inc., brochure entitled "Fiber Panel Products, Second Edition," front cover, Table of Contents, and pp. 1-111, Publication No. 846 (Jul. 1996) (116 pages total).
ADC Telecommunications, Inc.'s 6th Edition of Next Generation Frame (NGF) Product Family Ordering Guide; front cover, Table of Contents, pp. 1-41, and back cover; Item No. 820 (revised Feb. 2003) (44 pAGES total).
ADC Telecommunications, Inc.'s Fiber Optic, Cable Assemblies and Accessories Brochure; front cover, Table of Contents, pp. 1-23, and back cover; Item No. 100300 (revised Apr. 2003).
ADC Telecommunications, Inc., Next Generation Frame (NGF) Product Family, Publication No. 832, 8 pages, (Dec. 2000).
ADC Telecommunications, Inc., brochure entitled "Secure Fiber Entrance Terminal (SFET)," front cover, pp. 2-7, and back cover, Item No. 1005 (revised May 1998) (8 pAGES total).
ADC Telecommunications, Inc., brochure entitled "Outside Plant, Fiber Cross-Connect Solutions," front cover, Table of Contents, pp. 1-48, and back cover, Item No. 1047 (Jun. 2002).
Alcoa Fujikura Ltd., brochure entitled "Couplers: Couplers WDMS Packaging,", 5 pages (copyright 2000).
AMP Inc. catalog entitled "Fiber Optic Products," front and back covers and p. 59, (4 pgs. ) (© 1991).
Assembly reference drawings having drawing No. 1067101, dated Aug. 17, 1999 (8 pages).
AT&T Network Systems catalog entitled "Fiber Optic Products Innovation for wide ranging applications," front and back covers and pp. 6-1 through 6-16 (18 pages total) (© 1995).
AT&T Network Systems, Product Bulletin, "High Density Interconnect System (HDIC)," 2987D-DLH-7/89, Issue 2, 4 pages (Copyright 1989).
ATI Optique Catalog, ATI Optique Division of TI electronique, Version 2.6, released Mar. 27, 2002 (50 pages).
Amphenol Corp., brochure entitled "Amphenol® 954 Series one piece SC Connector," F122-00311, Issue 1, 2 pages (Aug. 1990).
21 photographs showing what AFL Telecommunications LLC purports to be the ECOE cabinet referenced in the Prior art statement and the Supplemental prior art statement listed above. AFL Telecommunications LLC asserts the cabinet was on sale as early as 2001.
24 photos of LambdaUnite® Blank Card; "LambdaUnite® MultiService Switch (MSS)" brochure (2003); and "Lucent's LambdaUnite® Busts Out" official release (Jan. 29, 2002) (33 pages total).
Bockstaele et al., "A scalable parallel optical interconnect family," IO Overview Paper, Apr. 2004 (10 pages).
First Office Action for Chinese Patent Application No. 201880064427.4 mailed Mar. 2, 2021, 9 pages.
Connectorized splitter drawings having drawing No. 1067961, dated Aug. 18, 1999 (2 pages).
Corning Cable Systems, "Installation Instructions for 12-position Splice Protector Insert," SRP-001-276, Issue 4, 1 page (Jul. 2001).
Corning Cable Systems, "Jumper Routing Procedure for Enhanced Management Frame," SRP-003-599, Issue 2, 4 pages (Apr. 2002).
Extended European Search Report for Application No. 18864713.5 mailed May 19, 2021.
Fiber distribution drawings having drawing No. 1069967, dated Aug. 17, 1999 (2 pages).
FONS Corporation, MDC Series Rack or Wall Mount Enclosures product sheet, 3 pages (2002).
FONS Corporation, Modular Distribution Cabinets Rack Mount Enclosures, Model MDC-7, product sheet, 2 pages (2005).
FONS Corporation's Technical Drawing No. 11669, Rev. D, of Distribution Cabinet Assembly MFDC-7, 1 page (technical drawing depicting the device shown in Exhibit M).
Grimes, "Applications of Parallel Optical Interconnects," Lasers and Electro-Optics Society Annual Meeting, Nov. 18-21, 1996, pp. 6-7, vol. 2 (2 pages).
Hasegawa et al., "100GHz-48CH Athermal AWG with a Novel Temperature Insensitive Principle," National Fiber Optics Engineers Conference, 2003 Technical Proceedings, pp. 801-808.
"High-density FlexPlane™ Optical Circuitry provides high-density optical routing on PCBs or backplanes", Molex, 3 pages (2012).

(56) References Cited

OTHER PUBLICATIONS

Hirose Electric Co., Ltd., catalog entitled "Optical Fibre Connectors," Catalog No. O.F. (9) 3K, front and back covers and pp. 16, 17 and 49 (Mar. 1991) (5 pages total).
http://www.youtube.com/watch?v=dNLFeCsa69E; LK Flexible film Screen Protector Installation Video; May 8, 2017.
International Search Report and Written Opinion of the International Searching Authority for International Patent Application No. PCT/US2018/053935 mailed Mar. 29, 2019, 11 pages.
International Standard, "Fiber optic connector interfaces—Part 4-1: Type SC connector family—Simplified receptacle SC-PC connecter interfaces," Copyright IEC 61754-4-1, First edition, Jan. 2003 (9 pages).
Installation drawings having drawing No. 1069965, dated Aug. 14, 1999 (3 pages).
Iwano, S. et al., "MU-type Optical Fiber Connector System," NTT Review, vol. 9, No. 2, pp. 63-71 (Mar. 1997).
Nexans, "Cross-Connect Cabinet III: Plastic Watertight Cabinet for FTTH Applications," 2 pages (Oct. 2002).
Nexans, "Cross-Connect Cabinet V: Metallic Watertight Cabinet for FTTH Applications," 2 pages (Oct. 2002).
Northern Telecom Bulletin #91-004, Issue #2, 16 pages (May 1991).
NTT International, brochure entitled "Fiber Termination Module (FTM) & Premises Optical Distribution Cabinets (PODC)," 3 pages, undated.
"OMX™ 600 Optical Distribution Frame," ADC Telecommunications, Inc., Publication No. 854, front cover, table of contents, pp. 1-13, rear cover (Apr. 2000).
"Optical fiber coupler review," Manufacturing Group at the Optoelectronics Division, Technical Report 2001, Products Presentation, showing Sumitomo Osaka Cement Co. Ltd's Optical Coupler (pp. 41-42).
Precision Mechanical, in Chinese with English Translation, 5 pages (publicly known at least as early as Aug. 2002).
Preface to the book "Structure, Installation, Connection and Protection of Communication Optical Fiber Cable," in Chinese with English Translation, 14 pages (Mar. 1992).
Schneider et al., "Fibre Optic Circuits," TechCon 2011 (10 pages).
Shahid, M.A. et al., "Flexible Optical Backplane Interconnections," Proceedings of MPPOI'96, pp. 178-185 (1996).
Shahid et al., "Flexible High Density Optical Circuits," National Fiber Optic Engineers Conference, 2001 Technical Proceedings (8 pages).
Sugita et al., "SC-Type Single-Mode Optical Fiber Connectors," Journal of Lightwave Technology, vol. 7, No. 11, pp. 1689-1696 (Nov. 1989).
Tachikura et al., Newly Developed Optical Fiber Distribution System and Cable Management in Central Office, International Wire & Cable Symposium, Proceedings of the 50th IWCS, pp. 98-105.
U.S. Appl. No. 61/538,737, filed Sep. 23, 2011, entitled "Flexible Optical Circuit" (13 pages).
U.S. Appl. No. 61/707,323, filed Sep. 28, 2012 entitled "Fiber Optic Cassette."
U.S. Appl. No. 62/027,657, filed Jul. 22, 2014 entitled "Door Hinge Mechanism for Telecommunications Panel."

* cited by examiner

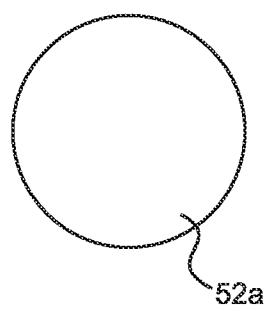 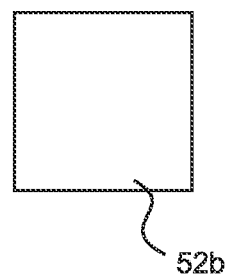 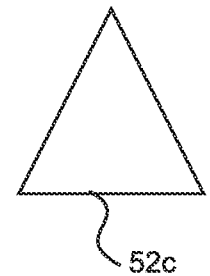
FIG. 7A  FIG. 7B  FIG. 7C
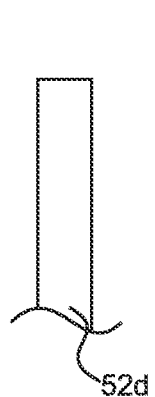 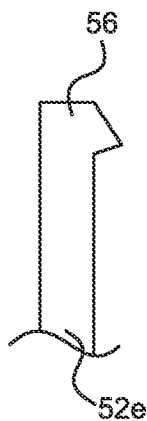 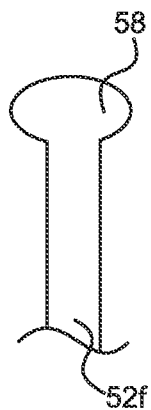
FIG. 8A  FIG. 8B  FIG. 8C

FIBER OPTIC CABLE MANAGEMENT SYSTEMS AND METHODS

CROSS-REFERENCE TO RELATED APPLICATION

This application is a National Stage Application of PCT/US2021/025135, filed on Mar. 31, 2021, which claims the benefit of U.S. Patent Application Ser. No. 63/003,043, filed on Mar. 31, 2020, the disclosures of which are incorporated herein by reference in their entireties. To the extent appropriate, a claim of priority is made to each of the above disclosed applications.

TECHNICAL FIELD

The present disclosure relates generally to telecommunications cable management devices. More specifically, the present disclosure relates to fiber optic cable management systems and methods.

BACKGROUND

Various devices are used to manage, store and/or protect optical fibers and optical splices. These devices may include trays that have relatively hard plastic constructions and include added structures for routing optical fibers and splicing locations. Improvements in fiber management are needed for optical fiber accessibility, handling, managing, and storing.

SUMMARY

Certain aspects of the present disclosure relate to a fiber optic management assembly or system for managing optical fibers, such as in fiber optic equipment, such as closures.

The fiber optic management system can include a telecommunications equipment, such as a closure, including a base; a cover; at least one mounting structure positioned within the base of the telecommunications equipment; at least one fixation element; and at least one optical fiber mounted to the at least one fixation element. The fixation element mounts to the mounting structure to mount the optical fiber to the base of the telecommunications equipment.

In certain examples, the at least one fixation element can take the form of a fixation tag mounted to the optical fiber. The fixation tag can mount to the at least one mounting structure to manage the at least one optical fiber within the telecommunications equipment. The fixation tag can take the form of a flexible foil mounted to at least part of the optical fiber.

In some embodiments, there is more than one optical fiber mounted to the fixation tag.

In some embodiments, there is more than one fixation tag for the optical fiber or fibers.

In some embodiments, the mounting structure includes a post for receiving the fixation tag.

In some embodiments, the mounting posts can include retention portions, such as a shoulder or an enlarged portion to increase retention of the fixation tag.

In some embodiments, the post is one post and a plurality of other posts are provided for additional fixation tags.

In some examples, the flexible foil is used for manufacturing the fiber optic circuit with the various fiber optic cables of the circuit. In some cases, the fiber optic circuit can include loose fibers, ribbonized fibers, or fibers contained within a flex foil.

The fixation element or elements hold the optical fiber or fibers in a desired location within the closure or other device so that the fiber or fibers are not damaged or excessively bent.

Another aspect of the present disclosure relates to a fiber management cable assembly where the optical fiber circuit extends from one end to an opposite end. The ends can be spliced to other fibers or connectorized with single fiber connector(s) or multifiber connector(s). The fiber management cable assembly can include at least one flexible foil element, and optical fibers mounted to the one or more flexible foil elements.

In certain examples, the fiber management cable assembly can include a plurality of flexible foil elements. The plurality of flexible foil elements can include at least one management feature for managing optical fibers attached thereto within a telecommunications equipment.

Another aspect of the present disclosure relates to a method of assembly. The method can include a step of providing a fiber management cable assembly. The fiber management cable assembly can include one or a plurality of fixation elements. The method can also include one or a plurality of optical fibers mounted to the one or the plurality of fixation elements. The method can further include a step of mounting the one or the plurality of fixation elements to one or more mounting structures located within telecommunications equipment.

A further aspect of the present disclosure relates to a telecommunications equipment. In certain examples, the telecommunications equipment can include a housing including a base and a plurality of fiber optic adapters secured to the housing. The fiber optic adapters can include connector ports accessible from inside the housing.

In certain examples, the telecommunications equipment can include a plurality of mounting structures positioned within the base and a plurality of fixation tabs. The plurality of fixation tabs can include a foil.

In certain examples, the telecommunications equipment can include a plurality of optical fibers mounted to the plurality of fixation tabs. The plurality of fixation tabs can be mountable to the plurality of mounting structures to manage the optical fibers within the housing.

In certain examples, the optical fibers can have connectorized ends that plug into the connector ports of the fiber optic adapters.

The various aspects characterized above in this section can be used together or separately in enclosure arrangements.

These and other features and advantages will be apparent from a reading of the following detailed description and a review of the associated drawings. A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIGS. 7A-C show examples of some top profiles for the mounting posts of the equipment.

FIGS. 8A-C show examples of some side profiles for the mounting posts of the equipment.

DETAILED DESCRIPTION

The present disclosure is directed generally to a fiber optic management system that includes fiber fixation elements, for example film elements, or flexible foil elements. In certain examples, the fixation elements of the present disclosure can be arranged and configured for use within a telecommunications equipment. The fixation elements can be utilized to position optical fibers within the telecommunications equipment.

In certain examples, the optical fibers can be terminated by a fiber optic connector or fiber optic connectors. Non-limiting examples of connectors include MPO style connectors, and single or duplex fiber connectors, such as LC or SC type connectors.

The fixation elements can include one or more (typically, multiple) optical fibers attached to and supported by a flexible planar substrate, such as a Mylar™ or other flexible polymer substrate. Although specific examples herein depict and describe planar substrates, it should be appreciated that other substrate configurations, e.g., in which a substrate fix optical fibers in and/or across multiple planes are also contemplated. In certain examples, the optical fibers can extend past ends of the film elements so that they can be terminated to optical connectors, which can be coupled to fiber optic cables or other fiber optic components through mating optical connectors.

The film elements can be constructed from preformed fiber optic circuits. Example fiber optic circuits is disclosed in PCT International Patent Application No. PCT/US2018/053935 (WO2019/070682A2), the disclosure of which is incorporated herein by reference in its entirety.

The fixation elements allow for quicker installation of the optical fibers into a telecommunications device such a closure. In one example, retention posts in the equipment interact with fixation tags of the optical circuit allow for rapid assembly of the optical circuit to the equipment.

Figure 1:
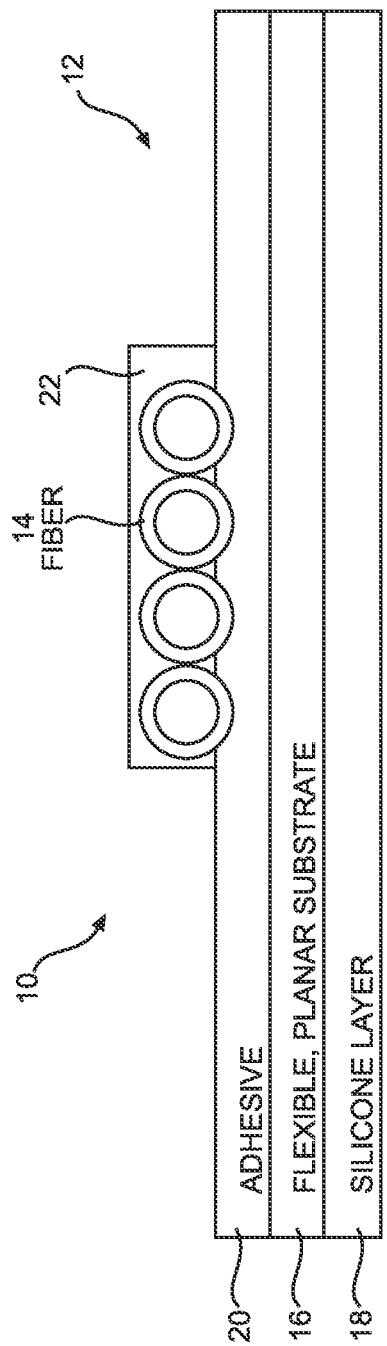
FIG. 1 is a schematic view showing multiple layers of an example fiber management cable assembly in accordance with principles of the present disclosure.

Turning to FIG. 1, a schematic view of a fiber management cable assembly 10 is illustrated. The fiber management cable assembly can include an example film element 12 (e.g., a flexible foil element; a fiber fixation tab, a fiber fixation tag, a PET foil) and one or more optical fibers 14. The film element 12 can include a composite structure that includes at least three layers of which one layer is a flexible planar substrate 16, a silicone coating layer 18, and an adhesive layer 20. That is, the flexible planar substrate 16 may have a siliconized side to facilitate release and an opposite, adhesive side.

Example adhesives include epoxy, light curable adhesive (e.g., ultraviolet light curable adhesive), thermo-form adhesive, thermo-set adhesive, index-matching adhesive or other adhesives. In certain examples, the adhesive layer 20 can be deposited on top of the flexible planar substrate 16.

In certain examples, the film element can be a multi-layer substrate that can include: a first planar flexible substrate layer (e.g., base substrate layer, bottom substrate layer, bulk substrate), an adhesive layer (e.g., epoxy), and an optional second planar flexible substrate layer (e.g., top substrate layer), although alternatives are possible.

In certain examples, the flexible planar substrate 16 may be formed from polyethylene terephthalate (PET). However, it would be understood that PET is simply one non-limiting example polymer that may be used to form the flexible planar substrate 16 of the present disclosure, and other polymers having similar characteristics can be used in accordance with the principles of the present disclosure, such as Mylar™.

The adhesive layer 20 on the flexible planar substrate 16 may be adapted to support the optical fibers 14. That is, one or more optical fibers 14 can be routed on the flexible planar substrate 16, typically with a needle extending from a robotic arm, and then secured to the flexible planar substrate 16 with the adhesive layer 20, which is allowed to set or cure.

In certain examples, an additional optional layer of material 22 can be applied on top of the optical fibers 14 and the adhesive layer 20 to affix the optical fibers 14. Any suitable material can be used for this purpose. In one non-limiting example, an elastomer such a silicone coating can be applied on top of the optical fibers 14 and the adhesive layer 20. The silicone coating layer 18 may be used to supplement the adhesive layer 20 to fix the optical fibers 14 onto the flexible planar substrate 16 and to cover the adhesive layer 20 to limit tackiness.

The film element 12 described above is one example of a fixation element for the optical fiber or fibers to be used with telecommunications equipment.

The method of assembly of the fiber management cable assembly 10 provides a number of advantages. For example, the assembly of the fiber management cable assembly 10 in accordance with the principles of the present disclosure allows a designer or technician to fix the optical fibers 14 in a predictable and automated manner such that a desired orientation or layout of the optical fibers 14 can be achieved. The film elements 12 are preferably constructed with a foil adapted to fix the optical fibers 14 within a telecommunications equipment 24 (see FIG. 5) that optimizes fiber bend radius limits and requirements. In certain examples, the telecommunications equipment 24 can be a closure, a module, a panel, or a tray, although alternatives are possible.

Aspects of the present disclosure relate to the flexible film-like substrate optionally having a flexibility that flexes up to but not beyond a minimum bend radius of an optical fiber intended to be managed. In one example, the optical fiber is a G657A or G652D optical fiber.

In one example, a plurality of different types of optical fibers are intended to be fixed by the film elements, and the minimum bend radius beyond which the film elements do not flex corresponds to the minimum bend radius of the optical fiber having the highest minimum bend radius of the optical fibers.

Preferably, the film elements 12 do not break or kink to ensure the safety and protection of the optical fibers 14. In certain examples, the film elements 12 are bendable in such a way that the optical fiber bend radius requirements are respected and satisfied.

In other examples, the film elements 12 may have a flexibility that allows the film elements to flex along a bend smaller than a minimum bend radius of the optical fiber or fibers being managed.

Figure 2:
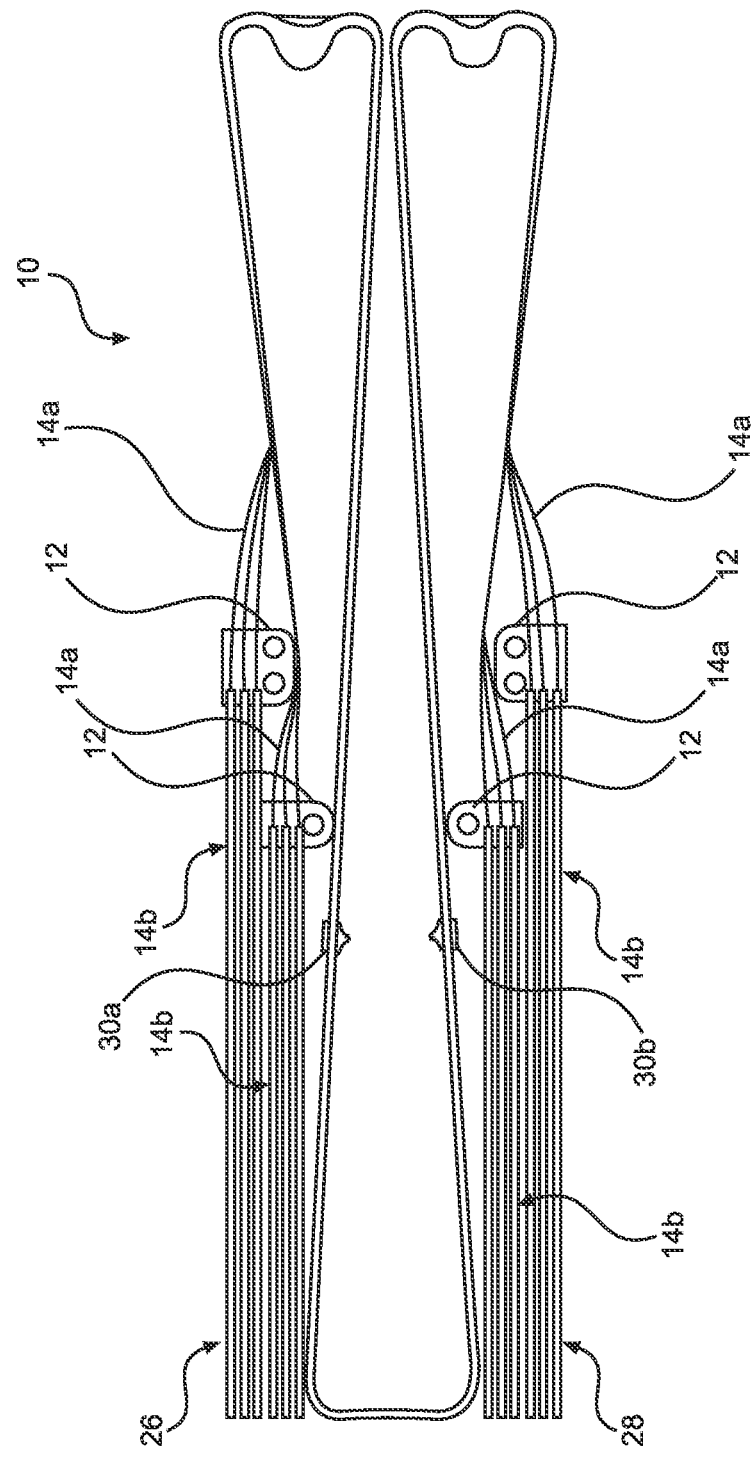
FIG. 2 is top, plan view of a fiber management cable assembly depicting an example flexible fiber circuit.

Turning to FIG. 2, a schematic top view of the example fiber management cable assembly 10 (e.g., final product cut from bulk substrate) including an example flexible fiber circuit is illustrated in accordance with the principles of the present disclosure.

Various optical fibers 14 are shown organized and supported by a plurality of film elements 12. In certain examples, the fiber management cable assembly 10 can include loose fibers 14a or single stranded fibers that are not coated. The loose fibers 14a can be left as a bare fiber. In other areas, the fiber management cable assembly 10 can include ribbonized fibers 14b. The ribbonized fibers 14b can be coated fibers.

The fiber management cable assembly 10 can include a first fiber optic circuit 26 and a second fiber optic circuit 28 that each include ribbonized fibers 14b. An example method of preparation of the first and second fiber optic circuits 26, 28 is disclosed in PCT International Patent Application No. PCT/US2018/053935 (WO2019/070682A2), the disclosure of which is incorporated herein by reference in its entirety.

That is, the first fiber optic circuit 26 can include six sets of twelve fibers that can be connectorized with a multi-fiber connector (not shown). That is, ends of the optical fibers 14b can be cleaved and polished in preparation of being terminated to a multi-fiber connector.

In certain examples, the loose fibers 14a or the ribbonized fibers 14b may be connected to other ribbons or connector (multi-fiber/simplex) stub fibers via a splicing operation. The second fiber optic circuit 28 may also include six sets of twelve fibers that may be connectorized later or later spliced.

In certain examples, identification flags 30a, 30b can be provided on the fiber management cable assembly 10 as a marker for correctly orienting and identifying the optical fibers 14b from one end of a piece of telecommunications equipment to an opposite end.

Figure 3:
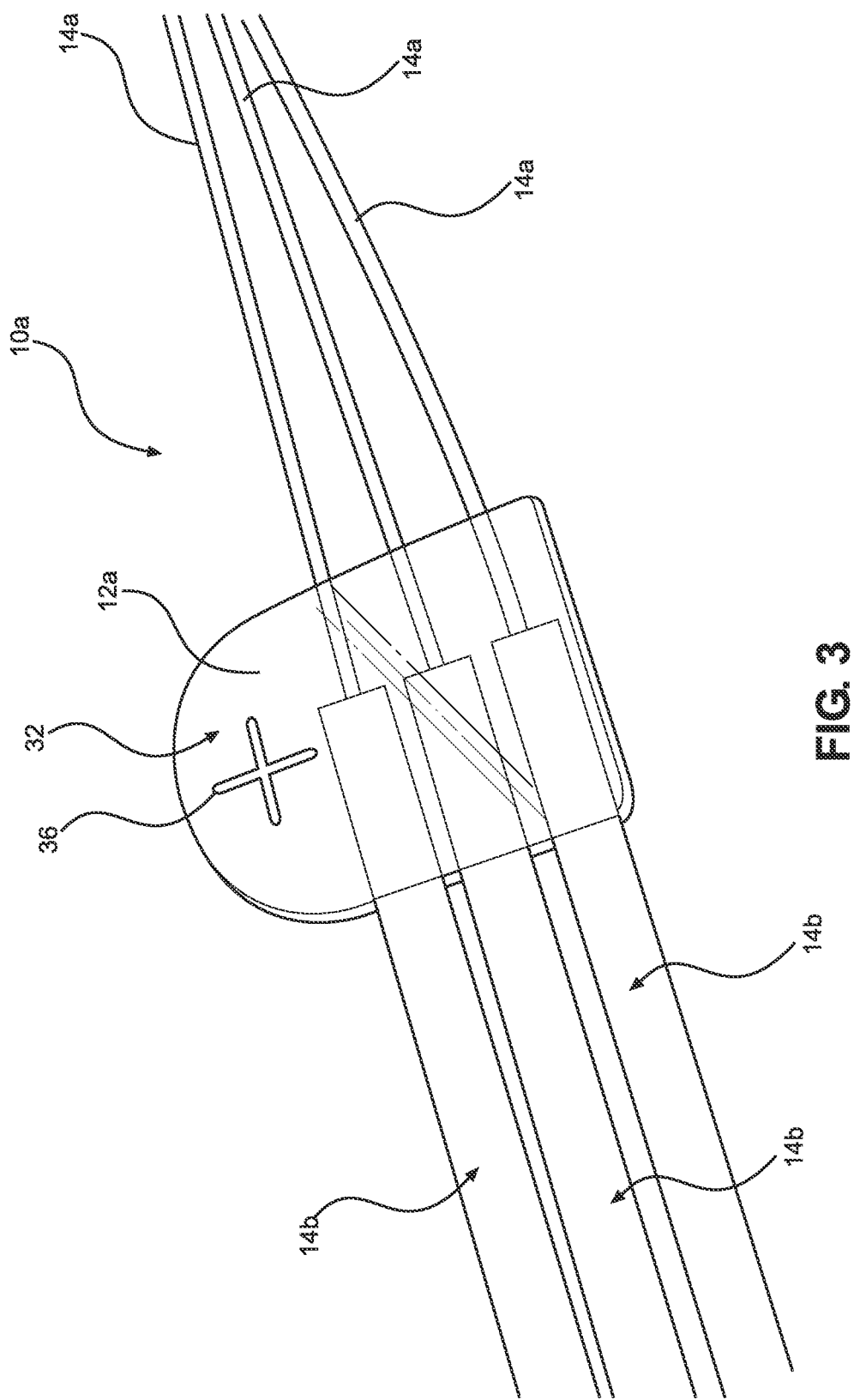
FIG. 3 is a schematic view of a fiber management cable assembly including a fixation element and optical fibers mounted to the fixation element in accordance with the principles of the present disclosure.

Turning to FIG. 3, a schematic view of another example fiber management cable assembly 10a is depicted. The fiber management cable assembly 10a can include a film element 12a and three sets of twelve ribbonized fibers 14b and loose fibers 14a mounted to the film element 12a. In the example depicted, the film element 12a defines a cutout region 32 that has a shape or configuration of a plus-sign, although alternative shapes are possible. The cutout region 32 of the film element 12 can be cut out into multiple shapes and/or sizes. For example, the cutout region 32 of the film element 12 can be cut or torn out as indicated at a perforated line 34 (e.g., cutting line, scored line). The cutting process can be accomplished by any known cutting techniques. For example, any known arrangements, operations, controlling machines or devices for cutting-out, stamping out, punching, perforating and also for severing may be used.

Figure 4:
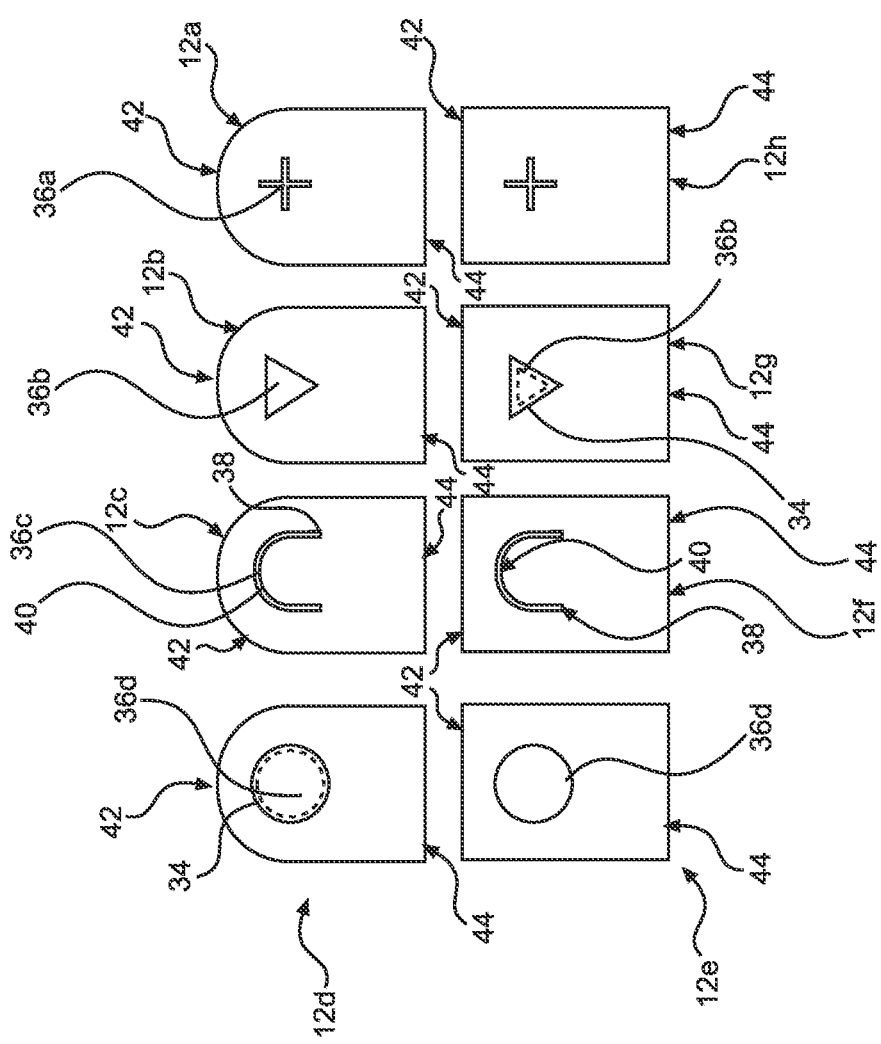
FIG. 4 is a schematic view of examples of multiple fixation elements defining a cutout region in a variety of shapes in accordance with the principles of the present disclosure.

Referring to FIG. 4, multiple film elements 12a-h are depicted. The film elements 12a-h can each include the cutout region 32. In certain examples, the film elements 12a-h may each include the perforated line 34 (e.g., cutting line, scored line) about the cutout region 32. Tearing along the perforated line 34 of the cutout region 32 allows a portion of the material of the film element 12 to be removed to create an opening 36 (e.g., fixation holes, apertures) therein.

In certain examples, the film element 12 may include a plus-sign opening 36a, a triangular opening 36b, a U-shaped opening 36c or a circular opening 36d. It will be appreciated that any number of shapes are possible. The cutout region 32 of the film elements $12_{a\text{-}h}$ can be used to frictionally mount the film elements $12_{a\text{-}h}$ to structure positioned within the telecommunications equipment 24. In certain examples, the U-shaped opening 36c can be fixed at one end 38 and unattached at the other end 40 to create a flap that may be flexed up to allow the U-shaped opening 36c to receive structure on the telecommunications equipment 24. In addition, structure located within the telecommunications equipment 24 can be received within the triangular, circular, or plus-sign openings 36a,b,d to frictionally mount the film elements $12_{a\text{-}h}$ thereto.

The film elements 12 can take the shape of a square, rectangle, or circle, although alternatives are possible. In certain examples, the film elements $12_{a\text{-}d}$ can have a curved edge at a first end 42 and a substantially straight edge at an opposite, second end 44, although alternatives are possible. In certain examples, the film elements $12_{e\text{-}h}$ may have two substantially straight edges at the first and second ends 42, 44.

Figure 5:
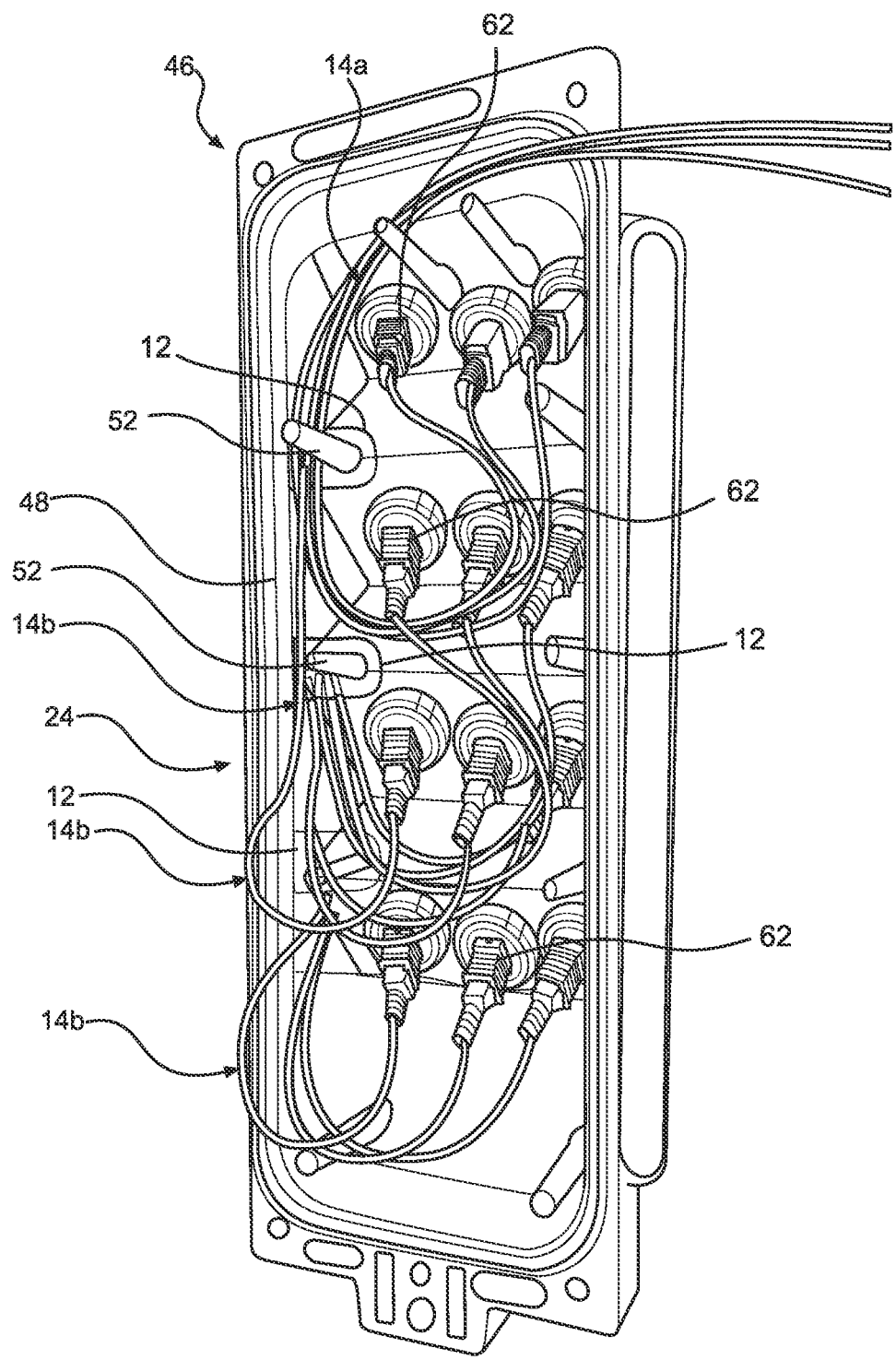
FIGS. 5-6 are perspective views of the fixation element of FIG. 3 positioned in a telecommunications equipment in accordance with the principles of the present disclosure.

Referring to FIG. 5, an example fiber optic management system 46 is depicted in accordance with the principles of the present disclosure.

The fiber optic management system 46 can include the telecommunications equipment 24 having a base 48, at least one mounting structure 50 positioned within the base 48 of the telecommunications equipment 24, at least one film element 12, and at least one optical fiber 14 mounted to the at least one film element 12.

In certain examples, the at least one mounting structure 50 includes a plurality of mounting structures, the at least one film element 12 includes a plurality of film elements, and the at least one optical fiber 14 includes a plurality of optical fibers 14.

Figure 6:
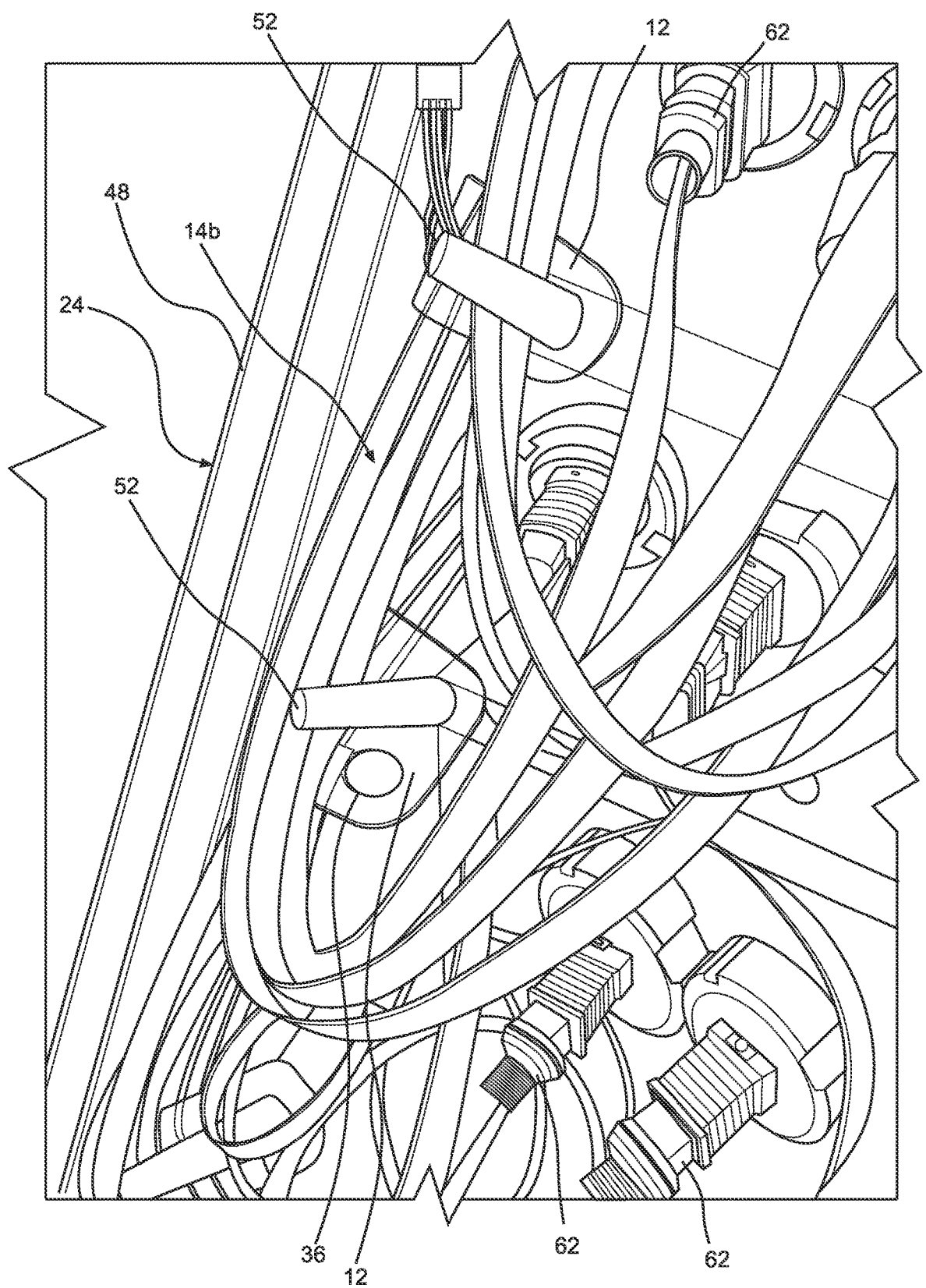

Turning to FIG. 6, the at least one film element 12 can be removably and frictionally mounted to the at least one mounting structure to manage the at least one optical fiber 14 within the telecommunications equipment 24. In certain examples, the at least one mounting structure 50 includes at least one post 52 (e.g., support, catch) located within the telecommunications equipment 24. The post 52 can be arranged and configured to be received in the opening 36 of the film element 12. That is, the opening 36 defined in the at least one film element 12 can be adapted to receive the at least one mounting structure 50 such that the at least one film element 12 and the at least one optical fiber 14 can be attached or mounted in the base 48 of the telecommunications equipment 24. For example, when the film element 12 is mated with the mounting structure 50, the mounting structure 50 is inserted through the opening 36 defined in the film element 12 to fix or hold the optical fiber 14 in a fiber optic module, in a fiber optic housing, to a fiber optic panel, to a fiber optic frame, to a fiber optic tray or elsewhere. In certain examples, multiple film elements 12 may be mounted to a single mounting structure 50.

The fiber management cable assembly 10 including the film elements 12 and the optical fibers 14 can be arranged and configured such that the optical fibers 14 can be positioned in a pre-determined and fixed routing path within the telecommunications equipment 24. The film elements 12 can be used as a fiber management or routing tab such that separate retainers, lips, or fingers are not needed to fix or manage the optical fibers 14 within the telecommunications equipment 24.

In certain examples, the film elements 12 can be used for constraining lengths of optical fibers 14 loosely arranged on the telecommunication equipment 24. That is, the film elements 12 can be used to manage optical fibers 14 that are not adhesively attached.

Another aspect of the present disclosure relates to a method of assembly. The method can include a step of providing the fiber management cable assembly 40 that has a plurality of film elements 12. The method can also include a step of mounting a plurality of optical fibers 14 to the plurality of film elements 12. The method can further include a step of frictionally fixing the plurality of film elements 12 to selectively mounted structures 50 located within the telecommunications equipment 24. In certain examples, the method can include a step of cutting the plurality of film elements 12 to define the openings 36 therein. In certain examples, the method can include a step of connectorizing the plurality of optical fibers 14.

Referring now to FIGS. 7A-C, various example shapes for the posts 52 are shown. Post 52a is generally cylindrical. Post 52b is generally square. Post 52c is generally triangular.

FIGS. 8A-C shows various examples of the posts 52 from a side view. FIG. 8A shows a cylindrical post 52d. FIG. 8B shows a post 52e with a retention flange 56 to improve the retention of the film element 12. FIG. 8C shows an enlarged tip 58 to improve the retention of the film element 12.

With the optical circuit managed by the fixation tags 12 (for example film tags), the fibers are mounted to the equipment in an easier operation than feeding loose fibers under overhanging tabs.

With the optical circuit managed by the fixation tags 12 (for example film tags), the fibers are mounted to the equipment for longer term retention than feeding loose fibers under overhanging tabs. In other words, the fibers are less likely to pop out and get caught in an interface between a cover and a base or in a hinge area.

Figure 9:
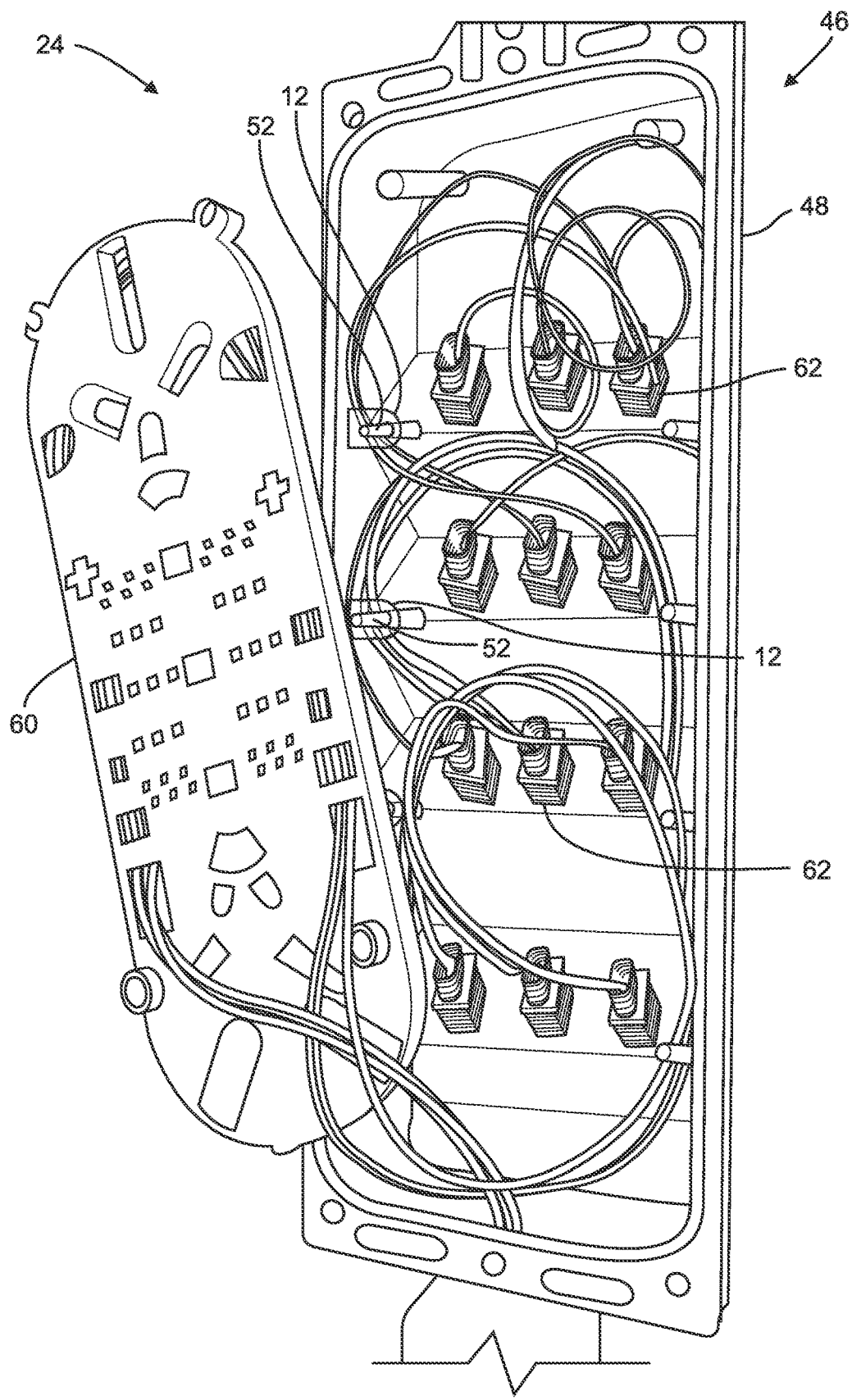
FIGS. 9-12 show various telecommunications equipment with fixation elements for mounting optical fibers in the equipment.
Figure 10:
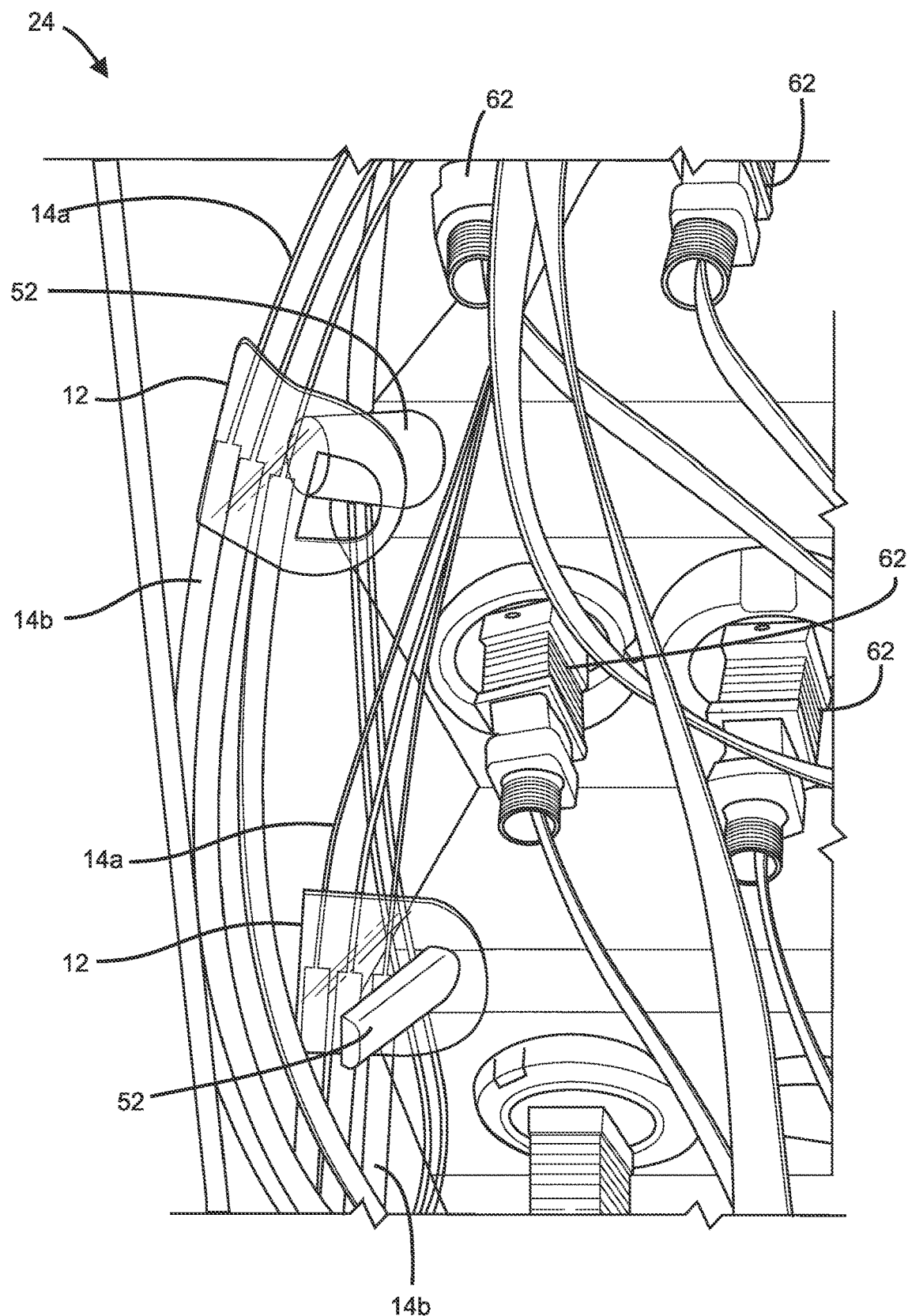
Figure 11:
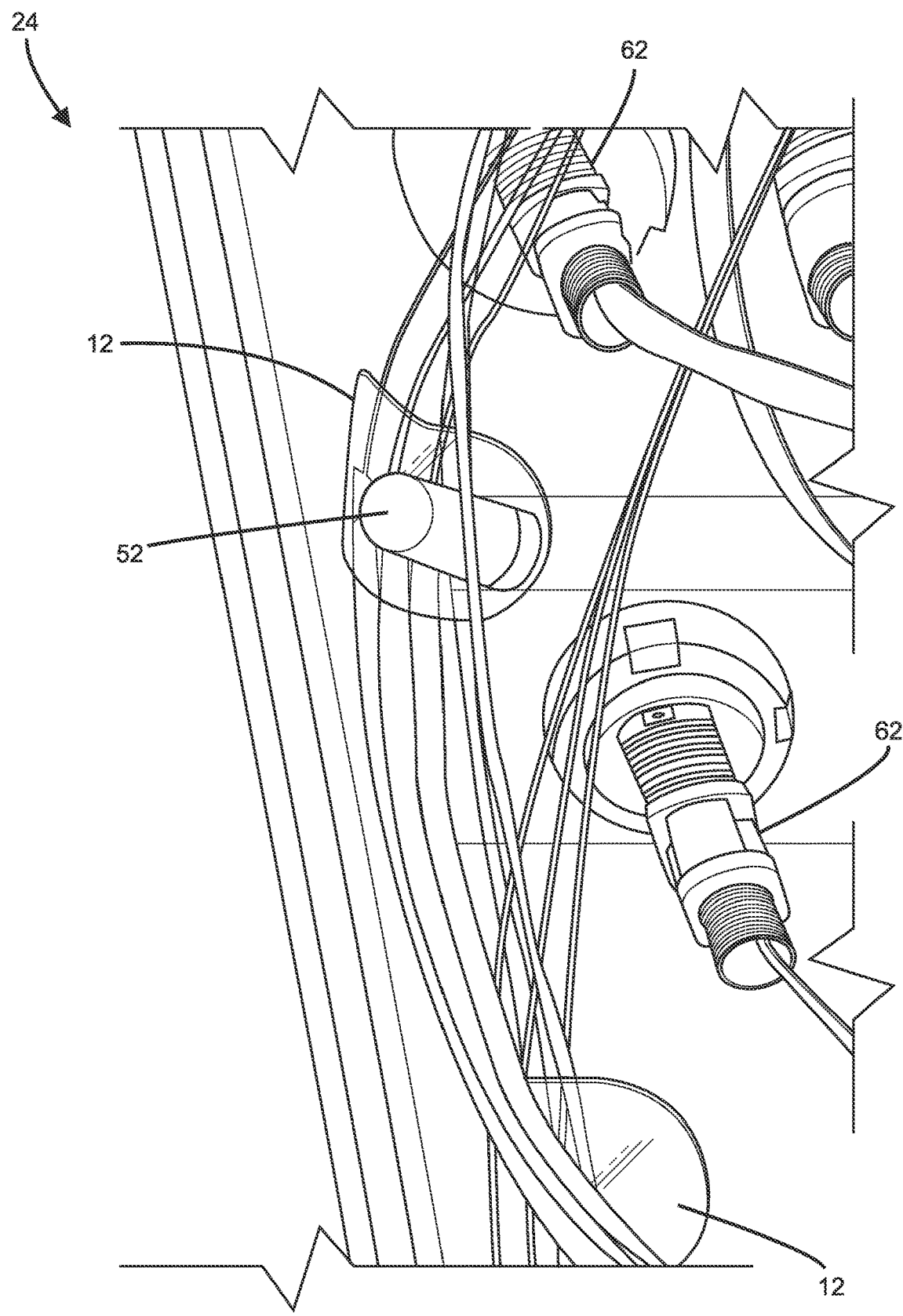
Figure 12:
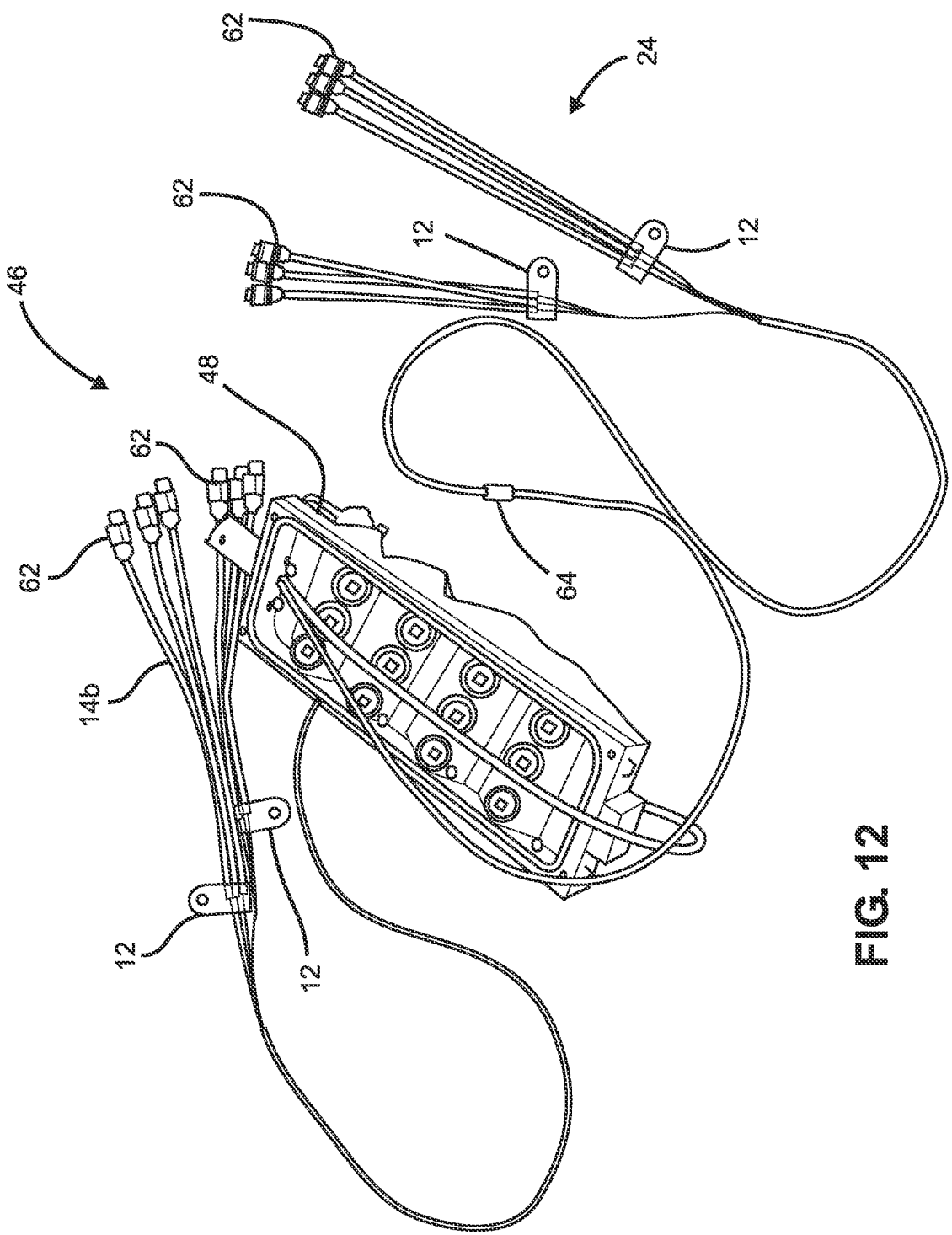

Referring to FIGS. 9-12, various examples of equipment 24 are shown where film elements 12 are used to secure fibers to a base 48 for example. FIG. 9 shows a fiber management tray 60 for use in managing the fibers in the equipment, including fiber slack. FIGS. 9-12 show MPO connectors 62 mounted on the ends of ribbon cables. FIG. 12 shows a splice 64 for connecting the fibers of the fiber assemblies 10 to one another. The splice 64 can be secured on a tray like tray 60.

From the forgoing detailed description, it will be evident that modifications and variations can be made without departing from the spirit and scope of the disclosure.

What is claimed is:

1. A fiber optic management system, comprising:
   a telecommunications equipment including a base;
   at least one mounting structure positioned within the base of the telecommunications equipment;
   at least one fixation element that is a fiber fixation tab, wherein the fiber fixation tab includes a planar flexible substrate layer and a coating layer on the planar flexible substrate layer; and
   at least one optical fiber mounted to the at least one fixation element, wherein the fiber fixation tab defines a cutout;
   wherein the at least one fixation element is mounted to the at least one mounting structure via the cutout of the fiber fixation tab to manage the at least one optical fiber within the telecommunications equipment,
   wherein the fiber optic management system further includes an identification flag in addition to the at least one fixation element provided on the at least one optical fiber for correctly identifying and orienting the at least one fiber from one end of the telecommunications equipment to an opposite end of the telecommunications equipment.

2. The fiber optic management system of claim 1, wherein the at least one fixation element includes a perforated line that is adapted to be torn to fully expose an opening that defines the cutout for receiving the at least one mounting structure.

3. The fiber optic management system of claim 1, wherein the at least one mounting structure is a post located within the telecommunications equipment.

4. The fiber optic management system of claim 1, wherein the planar flexible substrate layer is a first planar flexible substrate layer, the fiber fixation tab further includes a second planar flexible substrate layer, and the coating layer is located between the first and second planar flexible substrate layers.

5. The fiber optic management system of claim 1, wherein the fiber fixation tab includes a foil.

6. The fiber optic management system of claim 1, wherein the at least one optical fiber is terminated by a fiber optic connector.

7. A fiber management cable assembly, comprising:
   flexible foil elements; and
   optical fibers mounted to the flexible foil elements, wherein the flexible foil elements each define a cutout, wherein the fiber management cable assembly includes identification flags provided on the optical fibers for correctly identifying and orienting the optical fibers.

8. The fiber management cable assembly of claim 7, wherein the optical fibers are terminated by fiber optic connectors.

9. The fiber management cable assembly of claim 7, wherein the flexible foil elements are fiber fixation tabs.

10. The fiber management cable assembly of claim 9, wherein each one of the fiber fixation tabs includes a planar flexible substrate layer and a coating layer on the planar flexible substrate layer.

11. The fiber management cable assembly of claim 9, wherein each one of the fiber fixation tabs includes a first planar flexible substrate layer, a second planar flexible substrate layer, and a coating layer located between the first and second planar flexible substrate layers.

12. A method of assembly comprising:
   providing a fiber management cable assembly, the fiber management cable assembly including a plurality of film elements;
   mounting a plurality of optical fibers to the plurality of film elements; and
   frictionally fixing the plurality of film elements to selectively mounted structures located within a telecommunications equipment; and
   providing identification flags on the plurality of optical fibers for correctly identifying and orienting the optical fibers.

13. The method of claim 12, further comprising a step of cutting the plurality of film elements to define an opening therein.

14. The method of claim 13, wherein the selectively mounted structures include posts.

15. The method of claim 14, wherein the posts are received in the opening of the plurality of film elements when the plurality of film elements are frictionally fixed to the selectively mounted structures.

16. The method of claim 12, wherein the plurality of film elements are fiber fixation tabs.

17. The method of claim 12, further comprising a step of connectorizing the plurality of optical fibers.

18. A fiber management cable assembly, comprising:
a plurality of flexible foil elements, the plurality of flexible foil elements including at least one management structure for managing optical fibers attached thereto within a telecommunications equipment, wherein the at least one management structure is a fiber fixation tab and wherein the fiber fixation tab defines a cutout, wherein the fiber management cable assembly includes identification flags provided on the optical fibers for correctly identifying and orienting the optical fibers within the telecommunications equipment.

19. The fiber management cable assembly of claim 18, wherein the cutout includes a circular shape.

20. The fiber management cable assembly of claim 18, wherein the cutout includes a triangular shape.

21. The fiber management cable assembly of claim 18, wherein the cutout includes a U-shape.

22. The fiber management cable assembly of claim 18, wherein the cutout includes a plus-sign shape.

23. The fiber management cable assembly of claim 18, wherein the fiber fixation tab is mounted to a component structure within the telecommunications equipment.

24. The fiber management cable assembly of claim 23, wherein the component structure is a post that is adapted to be received within the cutout of the fiber fixation tab when the fiber fixation tab is mounted thereto.

25. A telecommunications equipment comprising:
a housing including a base;
a plurality of fiber optic adapters secured to the housing, the plurality of fiber optic adapters including connector ports accessible from inside the housing;
a plurality of mounting structures positioned within the base;
a plurality of tabs, the plurality of tabs including a foil; and
a plurality of optical fibers mounted to the plurality of tabs, the plurality of tabs being frictionally mountable to the plurality of mounting structures to manage the optical fibers within the housing;
wherein the optical fibers have connectorized ends that plug into the connector ports of the fiber optic adapters,
wherein the telecommunications equipment further includes identification flags in addition to the plurality of tabs provided on the plurality of optical fibers for correctly identifying and orienting the optical fibers from one end of the housing to an opposite end of the housing.

26. The fiber management cable assembly of claim 7, wherein the identification flags are separate from the flexible foil elements.

27. The method of claim 12, wherein the identification flags are provided on the plurality of optical fibers separately from the plurality of film elements.

28. The fiber management cable assembly of claim 18, wherein the identification flags are separate from the flexible foil elements.

* * * * *

UNITED STATES PATENT AND TRADEMARK OFFICE
CERTIFICATE OF CORRECTION

PATENT NO. : 12,339,511 B2  
APPLICATION NO. : 17/916419  
DATED : June 24, 2025  
INVENTOR(S) : Thierry Mike Declerck Page 1 of 1

It is certified that error appears in the above-identified patent and that said Letters Patent is hereby corrected as shown below:

In the Claims

Column 8, Line 56, Claim 12: "film elements; and" should read --film elements;--

Signed and Sealed this  
Fourteenth Day of October, 2025

John A. Squires  
*Director of the United States Patent and Trademark Office*